United States Patent
Song et al.

(10) Patent No.: US 10,999,645 B2
(45) Date of Patent: May 4, 2021

(54) PLAYING CONTROL METHOD AND APPARATUS

(71) Applicant: Alibaba Group Holding Limited, Grand Cayman (KY)

(72) Inventors: Yang Song, Beijing (CN); Juncheng Liu, Beijing (CN); Hao Xu, Beijing (CN); Jie Li, Beijing (CN); Baiyu Pan, Beijing (CN); Ji Wang, Beijing (CN)

(73) Assignee: Alibaba Group Holding Limited, Grand Cayman (KY)

( * ) Notice: Subject to any disclaimer, the term of this patent is extended or adjusted under 35 U.S.C. 154(b) by 82 days.

(21) Appl. No.: 16/409,581

(22) Filed: May 10, 2019

(65) Prior Publication Data
US 2019/0268669 A1 Aug. 29, 2019

Related U.S. Application Data

(63) Continuation of application No. PCT/CN2017/109232, filed on Nov. 3, 2017.

(30) Foreign Application Priority Data

Nov. 11, 2016 (CN) .......................... 201610997225.8

(51) Int. Cl.
*H04H 60/32* (2008.01)
*H04N 21/6543* (2011.01)
(Continued)

(52) U.S. Cl.
CPC ....... *H04N 21/6543* (2013.01); *H04N 21/437* (2013.01); *H04N 21/44204* (2013.01);
(Continued)

(58) Field of Classification Search
CPC ............. H04N 21/6543; H04N 21/437; H04N 21/44204; H04N 21/47217; H04N 21/4758; H04N 21/6587
(Continued)

(56) References Cited

U.S. PATENT DOCUMENTS 4,453,259 A * 6/1984 Miller .................. H04L 7/0029
327/161
5,241,428 A * 8/1993 Goldwasser ........... G11B 15/56
360/32
(Continued)

FOREIGN PATENT DOCUMENTS

| CN | 102546608 A | 7/2012 |
|----|-------------|--------|
| CN | 102714708 A | 10/2012 |
| CN | 102970589 A | 3/2013 |
| CN | 103533388 A | 1/2014 |
| CN | 103561356 A | 2/2014 |
| CN | 104065982 A | 9/2014 |
| CN | 104284200 A | 1/2015 |

(Continued)

OTHER PUBLICATIONS

An application-level QoS comparison of inter-destination synchronization schemes for continuous media multicasting, Nunome et al., IEEE Global Telecommunications Conference, vol. 7, 2003. pp. 3602-3608 (Year: 2003).*

(Continued)

*Primary Examiner* — Michael B. Pierorazio
(74) *Attorney, Agent, or Firm* — Lee & Hayes, P.C.

(57) ABSTRACT

A play control method includes obtaining a playing state of at least one of a plurality of terminals playing a same video; and controlling a playing progress of at least one of the plurality of terminals when the playing state meets a preset condition. Using the disclosed play control method and apparatus for a plurality of terminals playing a same video, playing synchronization of the plurality of terminals can be maintained under a premise of ensuring that the plurality of terminals do not miss each video segment, so that no communication barrier is resulted due to asynchronous (Continued)

video playing during interactions between users who watch the same video, thus being able to improve user experience.

20 Claims, 12 Drawing Sheets

(51) Int. Cl.
H04N 21/437 (2011.01)
H04N 21/442 (2011.01)
H04N 21/472 (2011.01)
H04N 21/475 (2011.01)
H04N 21/6587 (2011.01)
(52) U.S. Cl.
CPC ... *H04N 21/4758* (2013.01); *H04N 21/47217* (2013.01); *H04N 21/6587* (2013.01)
(58) Field of Classification Search
USPC .......................................................... 725/14
See application file for complete search history.

(56) References Cited

U.S. PATENT DOCUMENTS

| | | | |
|---|---|---|---|
| 5,329,320 A * | 7/1994 | Yifrach | H04N 5/4448 348/559 |
| 5,467,137 A * | 11/1995 | Zdepski | H04N 21/23608 375/240.29 |
| 5,592,551 A * | 1/1997 | Lett | G06K 7/0047 380/211 |
| 5,673,252 A | 9/1997 | Johnson et al. | |
| 5,808,662 A * | 9/1998 | Kinney | G11B 27/002 348/14.1 |
| 6,169,843 B1 * | 1/2001 | Lenihan | H04N 9/8042 348/E5.005 |
| 6,215,774 B1 * | 4/2001 | Knauerhase | H04L 1/0002 370/252 |
| 6,233,389 B1 * | 5/2001 | Barton | H04N 21/4147 386/232 |
| 6,233,695 B1 * | 5/2001 | Ahn | H04N 21/2368 713/400 |
| 6,269,122 B1 * | 7/2001 | Prasad | H04N 5/04 348/425.4 |
| 6,279,090 B1 | 8/2001 | Manning | |
| 6,300,863 B1 * | 10/2001 | Cotichini | G06F 11/006 340/5.8 |
| 6,341,278 B1 * | 1/2002 | Yamamoto | G06F 3/0601 348/E5.008 |
| 6,598,172 B1 * | 7/2003 | Vandeusen | H04J 3/0632 370/389 |
| 6,611,537 B1 * | 8/2003 | Edens | H04L 12/2803 348/E7.05 |
| 6,622,171 B2 * | 9/2003 | Gupta | H04L 29/06027 709/219 |
| 6,642,939 B1 | 11/2003 | Vallone et al. | |
| 6,741,290 B1 * | 5/2004 | Wells | G06T 9/007 348/425.3 |
| 6,985,966 B1 * | 1/2006 | Gupta | G11B 27/034 709/204 |
| 6,996,624 B1 * | 2/2006 | LeCroy | H04L 29/06027 370/231 |
| 7,023,924 B1 * | 4/2006 | Keller | H04N 21/23424 375/240.26 |
| 7,096,271 B1 | 8/2006 | Omoigui et al. | |
| 7,113,983 B1 * | 9/2006 | Terada | H04N 21/6125 709/219 |
| 7,269,338 B2 * | 9/2007 | Janevski | H04N 5/76 386/201 |
| 7,344,084 B2 * | 3/2008 | DaCosta | H04N 7/17318 235/472.01 |
| 7,349,944 B2 | 3/2008 | Vernon et al. | |
| 7,502,381 B2 | 3/2009 | Nakamura | |
| 7,712,125 B2 * | 5/2010 | Herigstad | H04N 7/163 725/141 |
| 8,015,306 B2 | 9/2011 | Bowman | |
| 8,436,786 B2 | 5/2013 | Kamoto | |
| 8,565,667 B2 | 10/2013 | Argott | |
| 8,571,217 B2 | 10/2013 | Ishii et al. | |
| 9,509,635 B2 | 11/2016 | Park et al. | |
| 9,654,817 B2 | 5/2017 | Li et al. | |
| 2001/0047516 A1 | 11/2001 | Swain et al. | |
| 2002/0056129 A1 * | 5/2002 | Blackketter | H04N 21/435 725/112 |
| 2002/0118199 A1 * | 8/2002 | Mukherjee | G06F 3/1438 345/504 |
| 2003/0091322 A1 * | 5/2003 | Van Der Schaar | H04N 5/76 386/201 |
| 2003/0135632 A1 * | 7/2003 | Vrzic | H04W 72/1242 709/231 |
| 2004/0031058 A1 * | 2/2004 | Reisman | H04N 21/6587 725/112 |
| 2004/0045036 A1 | 3/2004 | Terasaki | |
| 2004/0142711 A1 | 7/2004 | Mahonen et al. | |
| 2004/0226050 A1 * | 11/2004 | Matsuzaki | H04N 21/2347 725/135 |
| 2004/0227855 A1 * | 11/2004 | Morel | H04N 5/23203 348/512 |
| 2005/0028200 A1 * | 2/2005 | Sardera | H04N 21/47 725/42 |
| 2005/0216731 A1 * | 9/2005 | Saito | H04N 21/2347 713/153 |
| 2005/0249240 A1 * | 11/2005 | Boyce | H04N 19/187 370/469 |
| 2005/0262261 A1 * | 11/2005 | Deshpande | H04L 65/80 709/231 |
| 2006/0031914 A1 * | 2/2006 | Dakss | H04N 21/435 725/135 |
| 2006/0072596 A1 * | 4/2006 | Spilo | H04N 21/4135 370/412 |
| 2006/0093317 A1 * | 5/2006 | Law | G09G 5/008 386/343 |
| 2006/0227796 A1 * | 10/2006 | Wei | H04L 47/50 370/412 |
| 2008/0134258 A1 * | 6/2008 | Goose | H04L 67/108 725/91 |
| 2008/0291266 A1 | 11/2008 | Burckart et al. | |
| 2010/0100917 A1 * | 4/2010 | Chiao | H04N 21/654 725/110 |
| 2010/0303100 A1 * | 12/2010 | Niamut | H04L 65/4076 370/503 |
| 2011/0123170 A1 | 5/2011 | Kure | |
| 2012/0002111 A1 * | 1/2012 | Sandoval | H04N 5/06 348/521 |
| 2012/0079541 A1 * | 3/2012 | Pan | H04N 21/4126 725/62 |
| 2012/0144435 A1 * | 6/2012 | Spilo | H04N 21/43615 725/78 |
| 2013/0077512 A1 | 3/2013 | Chang et al. | |
| 2014/0096169 A1 | 4/2014 | Dodson et al. | |
| 2014/0321826 A1 | 10/2014 | Stelmack et al. | |
| 2014/0359681 A1 * | 12/2014 | Amidei | H04N 21/6332 725/93 |
| 2017/0006331 A1 | 1/2017 | Jairath et al. | |

FOREIGN PATENT DOCUMENTS

| | | |
|---|---|---|
| CN | 104464767 A | 3/2015 |
| CN | 104469413 A | 3/2015 |
| CN | 104602037 A | 5/2015 |
| CN | 106507202 A | 3/2017 |
| WO | WO2012018300 A2 | 2/2012 |

OTHER PUBLICATIONS

Translation of CN Office Action from Corresponding CN Application No. 201610997225.8 dated Nov. 21, 2018, a counterpart foreign application for U.S. Appl. No. 16/409,581, 15 pages.
Translation of CN Office Action from Corresponding CN Application No. 201610997225.8 dated Apr. 2, 2019, a counterpart foreign application for U.S. Appl. No. 16/409,581, 13 pages.

(56) References Cited

OTHER PUBLICATIONS

Translation of CN Office Action from Corresponding CN Application No. 201610997225.8 dated Jul. 3, 2019, a counterpart foreign application for U.S. Appl. No. 16/409,581, 5 pages.
Translation of Written Opinion for corresponding PCT Application PCT/CN2017/109232, dated May 17, 2018, a counterpart foreign application for U.S. Appl. No. 16/409,581 , 2 pages.
Translation of Written Opinion for corresponding PCT Application PCT/CN2017/109232, dated May 11, 2018, a counterpart foreign application for U.S. Appl. No. 16/409,581 , 6 pages.
Translation of CN Search Report from Corresponding CN Application No. 201610997225.8 dated Nov. 6, 2018, a counterpart foreign application for U.S. Appl. No. 16/409,581, 2 pages.
Extended European Search Report dated Oct. 15, 2020 for Euroepan Patent Application No. 17368530.1, 12 pages.
Vingelmann, et. al., "Synchronized multimedia streaming on the iphone platform with network coding", IEEE Communications Magazine, vol. 49, No. 6, Jun. 1, 2011, pp. 126-132.
Partial European Search Report and Written Opinion dated Jul. 8, 2020 for Euroepan Patent Application No. 17868530.1, 16 pages.

\* cited by examiner

PLAYING CONTROL METHOD AND APPARATUS

CROSS REFERENCE TO RELATED PATENT APPLICATIONS

This application claims priority to and is a continuation of PCT Patent Application No. PCT/CN2017/109232 filed on 11 Mar. 2017, and is related to and claims priority to Chinese Patent Application No. 201610997225.8, filed on Nov. 11, 2016, entitled "Play control Method and Apparatus," which are hereby incorporated by reference in their entirety.

TECHNICAL FIELD

The present disclosure relates to the field of computer technologies, and particularly to play control methods and apparatuses.

BACKGROUND

With the rapid development of the Internet, people can now watch videos through devices such as mobile phones, tablets, virtual reality glasses or virtual reality helmets. At the same time, interactions between users have increased. For example, when watching a live video, a user can interact with the host, and can also send a barrage, gifts, etc. At present, when a number of persons watch live video through different terminals, if a terminal has a jamming phenomenon, playing often continues from a place when the jam occurs. In this method, if multiple jams are generated in the terminal, a time lag of the terminal relative to other terminals is increased. This leads to playing of multiple terminals to be out of synchronization, and causes hindrance for communications between users of the terminals. In another method, if a terminal has a jamming phenomenon, playing will start from the latest video stream after the jam. This method will cause the terminal to miss a video segment during jamming.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or processor-readable/computer-readable instructions as permitted by the context above and throughout the present disclosure.

In view of the above, a technical problem to be solved by the present disclosure is that existing play control technologies cannot maintain playing synchronization of multiple terminals under a premise of ensuring that multiple video terminals do not miss respective video segments.

In order to solve the above technical problem, a play control method is provided according to an embodiment of the present disclosure, which includes obtaining a playing state of at least one of a plurality of terminals playing a same video; and controlling a playing progress of one or more of the plurality of terminals when the playing state meets a preset condition.

In implementations, obtaining the playing state of at least one of the plurality of terminals playing the same video includes obtaining playing progresses of the plurality of terminals playing the same video, and determining a reference terminal from among the plurality of terminals according to the playing progresses of the plurality of terminals.

Controlling the playing progress of the one or more of the plurality of terminals when the playing state meets the preset condition includes separately calculating a difference between a playing progress of each of the plurality of terminals and a playing progress of the reference terminal; sending a playing progress adjusting instruction to a first terminal of the plurality of terminals according to a difference between a playing progress of the first terminal and the playing progress of the reference terminal when the difference between the playing progress of the first terminal and the playing progress of the reference terminal is greater than a first preset value, to cause the first terminal to adjust a playing speed according to the playing progress adjusting instruction until the difference between the playing progress of the first terminal and the playing progress of the reference terminal satisfies a first preset condition, wherein the first terminal is any terminal in the multiple terminals other than the reference terminal.

In implementations, determining the reference terminal from among the plurality of terminals according to the playing progresses of the plurality of terminals includes determining a terminal having the slowest playing progress as the reference terminal from among the plurality of terminals; or determining a terminal having the fastest playing progress as the reference terminal from among the plurality of terminals.

In implementations, the difference between the playing progress of the first terminal and playing progress of the reference terminal satisfying the first preset condition includes the difference between the playing progress of the first terminal and the playing progress of the reference terminal is zero; or the difference between the playing progress of the first terminal and the playing progress of the reference terminal being less than or equal to a second preset value, wherein the second preset value is determined based on the first preset value, and the second preset value is less than the first preset value.

In implementations, controlling the playing progress of the one or more of the plurality of terminals when the playing state satisfies the preset condition includes sending a playing pause instruction to terminal(s) other than a second terminal of the plurality of terminals after detecting that a playing state of the second terminal meets a second preset condition, to cause the other terminal(s) to pause playing the video, wherein the second terminal is any one of the plurality of terminals; sending a voting requesting message to the other terminal(s), to cause the other terminal(s) to return voting result(s) according to the voting requesting message, wherein the voting requesting message is used for requesting each terminal in the other terminal(s) to vote whether to wait for the second terminal; collecting statistics on the received voting result(s) to obtain a statistical result; and sending a playing resume instruction to the other terminal(s) to cause the other terminal(s) to continue playing the video in response to determining that the statistical result is not to wait for the second terminal.

In implementations, the playing state of the second terminal satisfying the second preset condition includes the second terminal pausing playing of the video; and/or the second terminal being disconnected from the server.

In order to solve the above technical problem, a play control method is provided according to another embodiment of the present disclosure, which includes obtaining a playing state of a first terminal playing a video, and sending the playing state of the first terminal to a server, so that the server returns a play control instruction when a playing state of at least one terminal of a plurality of terminals playing the same video satisfies a preset condition, wherein the plurality of terminals include the first terminal; and receiving the play control instruction from the server, and performing a play control according to the play control instruction.

In implementations, obtaining the playing state of the first terminal playing the video, and sending the playing state of the first terminal to the server include obtaining a playing progress of the video played by the first terminal, and sending the playing progress of the first terminal to the server, so that the server calculates a difference between the playing progress of the first terminal and a playing progress of the reference terminal, wherein the plurality of terminals include the reference terminal.

Receiving the play control instruction from the server, and performing the play control according to the play control instruction include receiving an instruction for adjusting the playing progress from the server in a case when the difference between the playing progress of the first terminal and the playing progress of the reference terminal is greater than a first preset value; and adjusting a playing speed according to the instruction for adjusting the playing progress until the difference between the playing progress of the first terminal and the playing progress of the reference terminal satisfies the first preset condition.

In implementations, adjusting the playing speed according to the instruction for adjusting the playing progress includes decreasing the playing speed according to the instruction for adjusting the playing progress if the playing progress of the reference terminal is slower than the playing progress of the first terminal; and increasing the playing speed according to the instruction for adjusting the playing progress if the playing progress of the reference terminal is faster than the playing progress of the first terminal.

In implementations, the difference between the playing progress of the first terminal and the playing progress of the reference terminal satisfying the first preset condition includes the difference between the playing progress of the first terminal and the playing progress of the reference terminal being zero; or the difference between the playing progress of the first terminal and the playing progress of the reference terminal is less than or equal to a second preset value, wherein the second preset value is determined based on the first preset value, and the second preset value is less than the first preset value.

In implementations, receiving the play control instruction from the server, and performing the play control according to the play control instruction include pausing to play the video in accordance with an instruction to pause playing when receiving an instruction to pause playing from the server.

In implementations, the method further includes receiving a voting requesting message from the server, and returning a voting result to the server according to the voting requesting message.

In implementations, receiving the play control instruction from the server, and performing the play control according to the play control instruction include continuing to play the video in accordance with an instruction to resume playing in an event that the instruction to resume playing from the server is received.

In order to solve the above technical problem, according to another embodiment of the present disclosure, a play control apparatus is provided, which includes a playing state acquisition module configured to obtain a playing state of at least one of a plurality of terminals playing a same video; and a play control module configured to control a playing progress of one or more of the plurality of terminals when the playing state meets a preset condition.

In implementations, the playing state acquisition module includes a reference terminal determination sub-module configured to obtain playing progresses of the plurality of terminals playing the same video, and determine a reference terminal from among the plurality of terminals according to the playing progresses of the plurality of terminals.

The play control module includes a first play control sub-module configured to separately calculate a difference between a playing progress of each of the plurality of terminals and a playing progress of the reference terminal; send a playing progress adjusting instruction to a first terminal of the plurality of terminals according to a difference between a playing progress of the first terminal and the playing progress of the reference terminal when the difference between the playing progress of the first terminal and the playing progress of the reference terminal is greater than a first preset value, to cause the first terminal to adjust a playing speed according to the playing progress adjusting instruction until the difference between the playing progress of the first terminal and the playing progress of the reference terminal satisfies a first preset condition, wherein the first terminal is any terminal in the plurality of terminals other than the reference terminal.

In implementations, the reference terminal determination sub-module is configured to determine a terminal having the slowest playing progress as the reference terminal from among the plurality of terminals; or determine a terminal having the fastest playing progress as the reference terminal from among the plurality of terminals.

In implementations, the difference between the playing progress of the first terminal and playing progress of the reference terminal satisfying the first preset condition includes the difference between the playing progress of the first terminal and the playing progress of the reference terminal is zero; or the difference between the playing progress of the first terminal and the playing progress of the reference terminal being less than or equal to a second preset value, wherein the second preset value is determined based on the first preset value, and the second preset value is less than the first preset value.

In implementations, the play control module includes a second play control sub-module configured to send a playing pause instruction to terminal(s) other than a second terminal of the plurality of terminals after detecting that a playing state of the second terminal meets a second preset condition, to cause the other terminal(s) to pause playing the video, wherein the second terminal is any one of the plurality of terminals; send a voting requesting message to the other terminal(s), to cause the other terminal(s) to return voting result(s) according to the voting requesting message, wherein the voting requesting message is used for requesting each terminal in the other terminal(s) to vote whether to wait for the second terminal; collect statistics on the received voting result(s) to obtain a statistical result; and send a playing resume instruction to the other terminal(s) to cause the other terminal(s) to continue playing the video in response to determining that the statistical result is not to wait for the second terminal.

In implementations, the playing state of the second terminal satisfying the second preset condition includes the second terminal pausing playing of the video; and/or the second terminal being disconnected from the server.

In order to solve the above technical problem, a play control apparatus is provided according to another embodiment of the present disclosure includes a playing state acquisition and sending sub-module configured to obtain a playing state of a first terminal playing a video, and send the playing state of the first terminal to a server, so that the server returns a play control instruction when a playing state of at least one terminal of a plurality of terminals playing the same video satisfies a preset condition, wherein the plurality of terminals include the first terminal; and a play control module configured to receive the play control instruction from the server, and performing a play control according to the play control instruction.

In implementations, the playing state acquisition and sending sub-module includes a playing progress acquisition and sending sub-module configured to obtain a playing progress of the video played by the first terminal, and send the playing progress of the first terminal to the server, so that the server calculates a difference between the playing progress of the first terminal and a playing progress of the reference terminal, wherein the plurality of terminals include the reference terminal.

The play control module includes a playing speed adjustment sub-module configured to receive an instruction for adjusting the playing progress from the server in a case when the difference between the playing progress of the first terminal and the playing progress of the reference terminal is greater than a first preset value; and adjust a playing speed according to the instruction for adjusting the playing progress until the difference between the playing progress of the first terminal and the playing progress of the reference terminal satisfies the first preset condition.

In implementations, the playing speed adjustment sub-module is configured to decrease the playing speed according to the instruction for adjusting the playing progress if the playing progress of the reference terminal is slower than the playing progress of the first terminal; and increase the playing speed according to the instruction for adjusting the playing progress if the playing progress of the reference terminal is faster than the playing progress of the first terminal.

In implementations, the difference between the playing progress of the first terminal and the playing progress of the reference terminal satisfying the first preset condition includes the difference between the playing progress of the first terminal and the playing progress of the reference terminal being zero; or the difference between the playing progress of the first terminal and the playing progress of the reference terminal is less than or equal to a second preset value, wherein the second preset value is determined based on the first preset value, and the second preset value is less than the first preset value.

In implementations, the play control module includes a control-to-pause-playing sub-module configured to pause playing the video in accordance with an instruction to pause playing when receiving an instruction to pause playing from the server.

In implementations, the apparatus further includes a voting module configured to receive a voting requesting message from the server, and return a voting result to the server according to the voting requesting message.

In implementations, the play control module includes a control-to-continue-playing the sub-module configured to continue playing the video in accordance with an instruction to resume playing in an event that the instruction to resume playing from the server is received.

In order to solve the above technical problem, a play control apparatus is provided according to another embodiment of the present disclosure includes processor(s); and memory configured to store processor executable instructions, the processor(s) being configured to obtain a playing state of at least one of a plurality of terminals playing a same video; and control a playing progress of one or more of the plurality of terminals when the playing state meets a preset condition.

In order to solve the above technical problem, a play control apparatus is provided according to another embodiment of the present disclosure includes processor(s); and memory configured to store processor executable instructions, the processor(s) being configured to obtain a playing state of a first terminal playing a video, and send the playing state of the first terminal to a server, so that the server returns a play control instruction when a playing state of at least one terminal of a plurality of terminals playing the same video satisfies a preset condition, wherein the plurality of terminals include the first terminal; and receive the play control instruction from the server, and perform a play control according to the play control instruction.

By obtaining a playing state of at least one of a plurality of terminals playing a same video, playing progresses of the plurality of terminals are controlled when the playing state satisfies a preset condition. Using the play control methods and apparatuses for a plurality of terminals playing a same video according to the embodiments of the present disclosure, synchronization of playing of the plurality of terminals can be maintained under a premise of ensuring that the plurality of terminals do not miss each video segment, so that no communication barrier is resulted due to asynchronous video playing during interactions between users who watch the same video, thus being able to improve user experience.

Other features and aspects of the present disclosure will become apparent from the following detailed description of exemplary embodiments.

BRIEF DESCRIPTION OF THE DRAWINGS

The drawings included in the specification form a part of the specification, and illustrate exemplary embodiments, features, and aspects of the present disclosure in conjunction with the specification. The drawings are used to explain the principles of the present disclosure.

DETAILED DESCRIPTION

Figure 1:
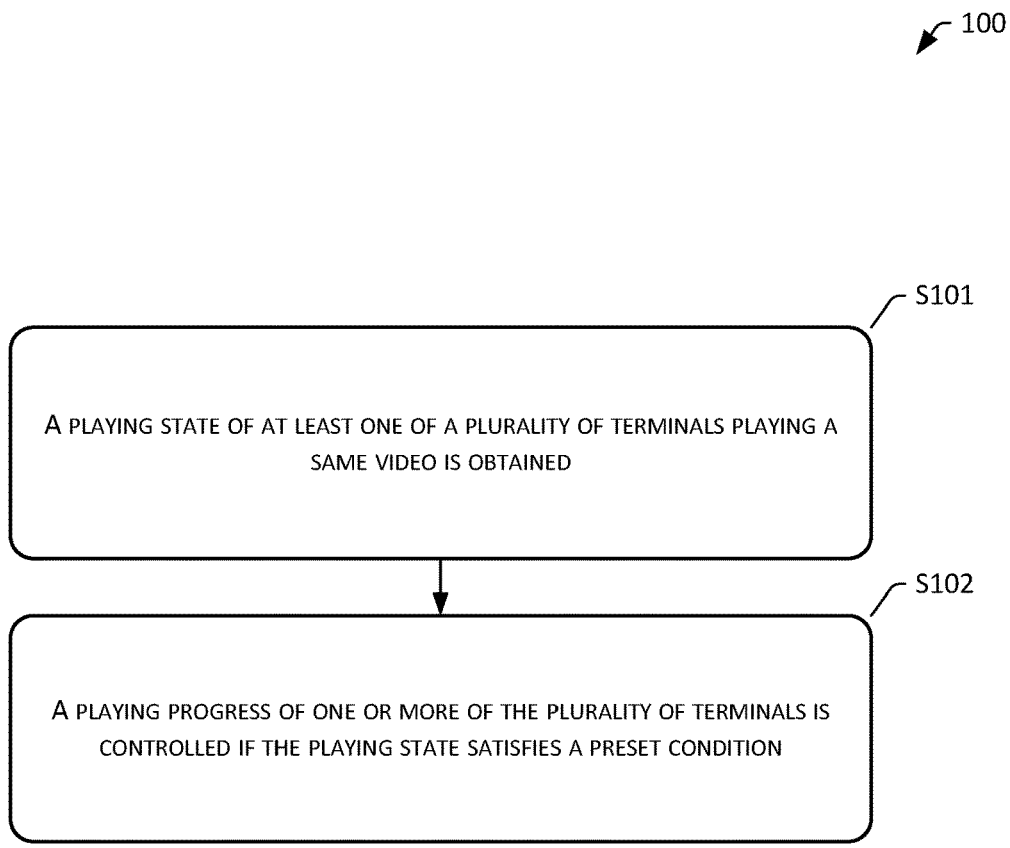
FIG. 1 illustrates a flowchart of an implementation of a play control method according to an embodiment of the present disclosure.

Various exemplary embodiments, features, and aspects of the present disclosure are described in detail hereinafter with reference to the drawings. Same reference numerals in the drawings denote same or similar elements. Although various aspects of the embodiments are illustrated in the drawings, the drawings are not necessarily drawn to scale unless indicated otherwise.

A term "exemplary" used herein is intended to mean "serving as an example, an embodiment, or illustrative." Any embodiment described herein as "exemplary" is not necessarily to be construed as being preferred or better than other embodiments.

In addition, numerous specific details are set forth in the detailed description hereinafter for a better description of the present disclosure. One skilled in the art should understand that the present disclosure can also be implemented without certain specific details. In some embodiments, methods, means, components, and circuits that are well known to one skilled in the art are not described in detail to facilitate emphasizing the goals of the present disclosure.

First Embodiment

FIG. 1 illustrates a flowchart of an implementation of a play control method 100 according to an embodiment of the present disclosure. An execution entity of the present embodiment may be a server, which is not limited herein. As shown in FIG. 1, the method 100 includes the following.

S101: A playing state of at least one of a plurality of terminals playing a same video is obtained.

In the present embodiment, a same video is played by a plurality of terminals simultaneously. In other words, the same video is simultaneously watched by a plurality of users separately using the plurality of terminals. In implementations, the plurality of terminals can enter a same virtual viewing room, and the plurality of terminals in the same virtual viewing room watch the same video. The server can associate the plurality of terminals in the same virtual viewing room to maintain a playback synchronization of the plurality of terminals in the same virtual viewing room.

The synchronization described in the present embodiment may be any of the following situations: playing progresses of the plurality of terminals being close to each other; playing progresses of most of the plurality of terminals being close to each other; the playing progresses of the plurality of terminals being the same; the playing progresses of most of the plurality of terminals being the same, which are not limited herein. A synchronization condition can also be set by one skilled in the art according to requirements, which is not limited herein.

As an example of the present embodiment, the plurality of terminals playing the same video may send respective playing states of the terminals to the server in every preset time interval, so that the server obtains a playing state of at least one of the plurality of terminals that play the same video. A playing status of a terminal may include one or more of a playing progress of the terminal, whether the terminal is in a pausing state, and a connection state between the terminal and the server.

S102: A playing progress of one or more of the plurality of terminals is controlled if the playing state satisfies a preset condition.

The playing state satisfying the preset condition may include a difference between playing progresses of two terminals of the plurality of terminals being greater than the first preset value, or one of the plurality of terminals pausing to play the video, or one of the plurality of terminals being disconnected from the server, which are not limited herein. The playing state satisfying the preset condition and the playing progress of the one or more of the plurality of terminals being controlled will be described hereinafter. Details of are not redundantly described here.

The play control method according to the present embodiment can maintain a playback synchronization of multiple terminals under a premise of ensuring that the multiple terminals do not miss each video segment, so that no communication barrier is resulted due to asynchronous video playing during interactions between users who watch the same video, thus being able to improve user experience.

Figure 2:
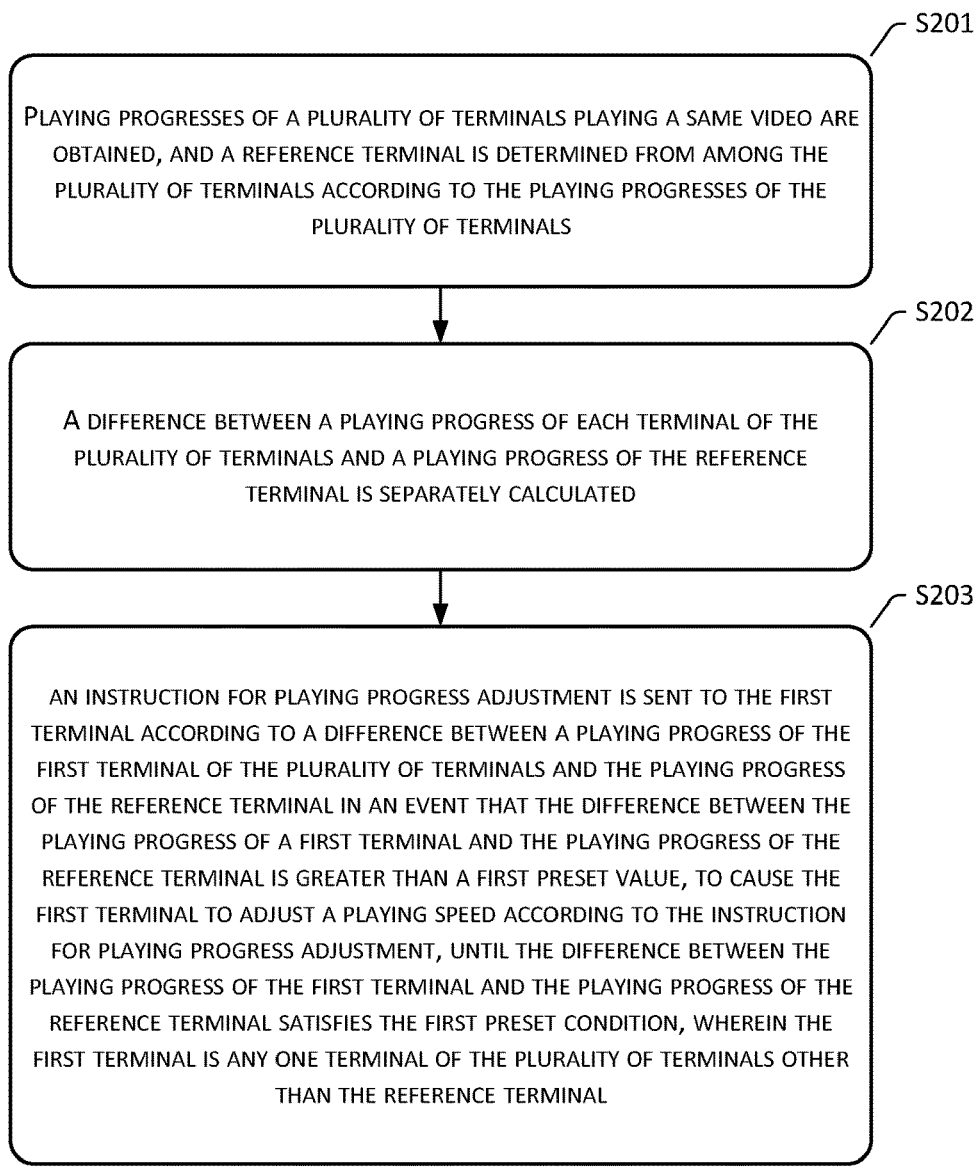
FIG. 2 illustrates a flowchart of an exemplary implementation of a play control method according to an embodiment of the present disclosure.

FIG. 2 illustrates a flowchart of an exemplary implementation of a play control method 200 in accordance with an embodiment of the present disclosure. As shown in FIG. 2, the method includes the following.

S201: Playing progresses of a plurality of terminals playing a same video are obtained, and a reference terminal is determined from among the plurality of terminals according to the playing progresses of the plurality of terminals.

In this example, obtaining the playing state of the at least one of the plurality of terminals playing the same video includes obtaining the playing progresses of the plurality of terminals playing the same video. In this example, the plurality of terminals playing the same video may send respective playing progresses of the terminals to the server in every preset time interval, so that the server can obtain the playing progresses of terminals playing the same video.

In implementations, determining the reference terminal from among the plurality of terminals according to the playing progresses of the plurality of terminals includes determining the terminal having the slowest playing progress as the reference terminal from among the plurality of terminals.

In implementations, determining the reference terminal from the plurality of terminals according to the playing progress of the plurality of terminals includes determining the terminal having the fastest playing progress as the reference terminal from among the plurality of terminals.

In implementations, the method further includes obtaining a timestamp corresponding to a playing progress of the video played by each terminal. By obtaining the timestamp corresponding to the playing progress of the video played by each terminal, the speed of playing the same video by each terminal can be determined according to a correspondence relationship between the timestamp and the playing progress.

S202: A difference between a playing progress of each terminal of the plurality of terminals and a playing progress of the reference terminal is separately calculated.

For example, if a terminal having the slowest playing progress is determined as the reference terminal from among the plurality of terminals, how much faster a playing progress of each terminal of the plurality of terminals as compared to a playing progress of the reference terminal can be determined by calculating a difference between the playing progress of each terminal and the playing progress of the reference terminal. If a terminal with the fastest playing progress is determined as the reference terminal from among the plurality of terminals, how much slower a playing progress of each terminal of the plurality of terminals as compared to a playing progress of the reference terminal can be determined by calculating a difference between the playing progress of each terminal and the playing progress of the reference terminal.

In implementations, the difference between the playing progress of each terminal of the plurality of terminals and the playing progress of the reference terminal may be separately calculated according to data such as a network delay.

S203: An instruction for playing progress adjustment is sent to a first terminal according to a difference between a playing progress of the first terminal of the plurality of terminals and the playing progress of the reference terminal in an event that the difference between the playing progress of the first terminal and the playing progress of the reference terminal is greater than a first preset value, to cause the first terminal to adjust a playing speed according to the instruction for playing progress adjustment, until the difference between the playing progress of the first terminal and the playing progress of the reference terminal satisfies the first preset condition, wherein the first terminal is any one terminal of the plurality of terminals other than the reference terminal.

By adjusting a playing speed of a terminal to enable playback synchronization between multiple terminals, a relatively gentle synchronization mode is provided, which makes it difficult for a user to perceive the influence of a synchronized playing progress, so that the user does not feel abrupt, thereby be able to improve the experience of the user.

In implementations, the difference between the playing progress of the first terminal and the playing progress of the reference terminal satisfying the first preset condition includes the difference between the playing progress of the first terminal and the playing progress of the reference terminal being zero. For example, the reference terminal is the terminal with the slowest playing progress among the plurality of terminals, and the first preset value is two seconds. If the playing progress of the first terminal is faster than the playing progress of the reference terminal by three seconds, the difference between the playing progress of the first terminal and the playing progress of the reference terminal is greater than the first preset value. The playing progress of the first terminal needs to be slowed down by three seconds to enable the difference between the playing progress of the first terminal and the playing progress of the reference terminal to become zero. In this case, an instruction of slowing down a playing speed may be sent to the first terminal. For example, the instruction of slowing down the playing speed may be to reduce the playing speed by 25%, and to reduce the time of the playing speed to twelve seconds, thereby enabling the first terminal to complete playing of a 9-second video that needs to be played next in twelve seconds.

In implementations, the difference between the playing progress of the first terminal and the playing progress of the reference terminal satisfying the first preset condition includes the difference between the playing progress of the first terminal and the playing progress of the reference terminal being less than or equal to a second preset value, wherein the second preset value is determined based on the first preset value, and the second preset value is smaller than the first preset value. For example, the reference terminal is the terminal with the slowest playing progress among the plurality of terminals. The first preset value is two seconds, and the second preset value is one half of the first preset value, i.e., the second preset value is one second. If the playing progress of the first terminal is faster than the playing progress of the reference terminal by three seconds, the difference between the playing progress of the first terminal and the playing progress of the reference terminal is greater than the first preset value, and the playing progress of the first terminal needs to be slowed down by two seconds, to make the difference between the playing progress of the first terminal and the playing progress of the reference terminal to be less than or equal to the second preset value. In this case, an instruction for slowing down a playing speed may be sent to the first terminal. For example, the instruction for slowing slow down the playing speed may be to reduce the playing speed by 25%, to reduce the time of the playing speed to eight seconds, thereby enabling the first terminal to complete playing a 6-second video that needs to be played next in eight seconds.

Figure 3:
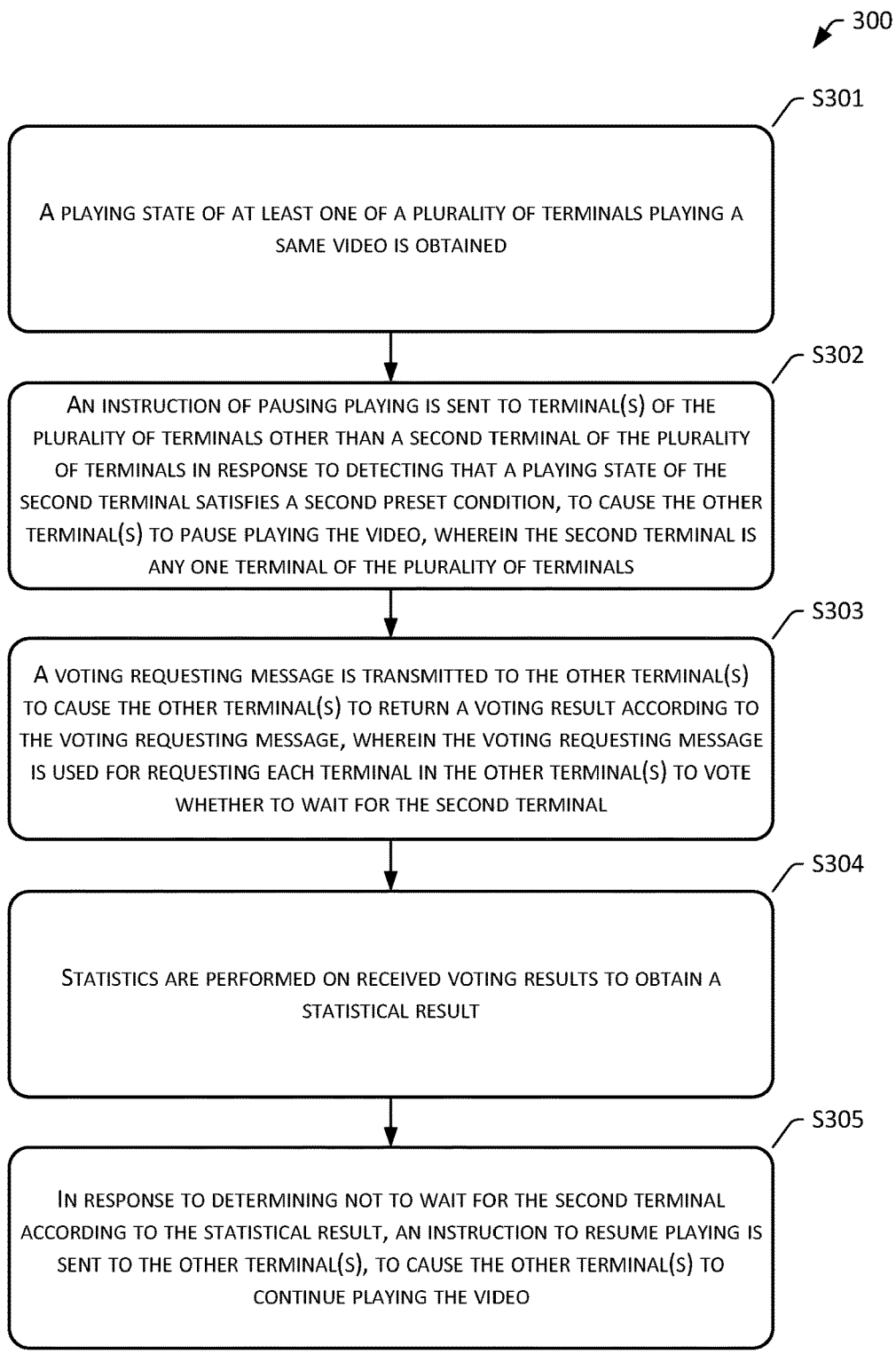
FIG. 3 illustrates a flowchart of an exemplary implementation of a play control method according to an embodiment of the present disclosure.

FIG. 3 illustrates a flowchart of an exemplary implementation of a play control method 300 in accordance with an embodiment of the present disclosure. As shown in FIG. 3, the method 300 may include the following operations.

S301: A playing state of at least one of a plurality of terminals playing a same video is obtained.

S302: An instruction of pausing playing is sent to terminal(s) of the plurality of terminals other than a second terminal of the plurality of terminals in response to detecting that a playing state of the second terminal satisfies a second preset condition, to cause the other terminal(s) to pause playing the video, wherein the second terminal is any one terminal of the plurality of terminals.

In implementations, the playing state of the second terminal satisfying the second preset condition includes the second terminal suspending playing of the video; and/or the second terminal being disconnected from a server.

In implementations, in response to detecting that a second terminal of the plurality of terminals pauses playing the video, an instruction to pause playing is sent to terminal(s) of the plurality of terminals other than the second terminal to cause the other terminal(s) to pause playing the video.

In implementations, in response to detecting that a second terminal of the plurality of terminals is disconnected from a server, an instruction to pause playing is sent to terminal(s) of the plurality of terminals other than the second terminal to cause the other terminal(s) to pause playing the video.

S303: A voting requesting message is transmitted to the other terminal(s) to cause the other terminal(s) to return a voting result according to the voting requesting message, wherein the voting requesting message is used for requesting each terminal in the other terminal(s) to vote whether to wait for the second terminal.

In implementations, the voting result may include any one of continuing to wait for the second terminal, not waiting for the second terminal, and abstention.

S304: Statistics are performed on received voting results to obtain a statistical result.

In implementations, if the number of votes for continuing to wait for the second terminal is greater than the number of votes for not waiting for the second terminal, a determination is made that the statistical result is to continue waiting for the second terminal. If the number of votes for continuing to wait for the second terminal is fewer than or equal to the number of votes for not waiting for the second terminal, a determination is made that the statistical result is not to wait for the second terminal.

S305: In response to determining not to wait for the second terminal according to the statistical result, an instruction to resume playing is sent to the other terminal(s), to cause the other terminal(s) to continue playing the video.

In this way, by detecting that the playing state of the second terminal of the plurality of terminals satisfies the second preset condition, an instruction to pause playing is sent to terminal(s) of the plurality of terminals other than the second terminal, to cause the other terminal(s) to suspend playing of the video. Under a condition that the second terminal of the plurality of terminals pauses to play the video or is disconnected, the terminal(s) other than the second terminal is enabled to obtain a notification that the playing state of the second terminal satisfies the second preset condition, and pause the video to maintain synchronization with the playback of the second terminal. By sending a voting requesting message to the other terminal(s), the other terminal(s) is/are allowed to return respective voting result(s) according to the voting requesting message. Received voting result(s) is/are counted, and a statistical result is obtained. If the statistical result indicates not to wait for the second terminal, an instruction to continue playing is sent to the other terminal(s), to cause the other terminal(s) to continue playing the video. This allows the other terminal(s) to decide and vote whether to continue waiting for the second terminal when the second terminal of the plurality of terminals suspends playing of the video or is disconnected, thereby improving the experience of multiple users who watch the same video.

Second Embodiment

Figure 4:
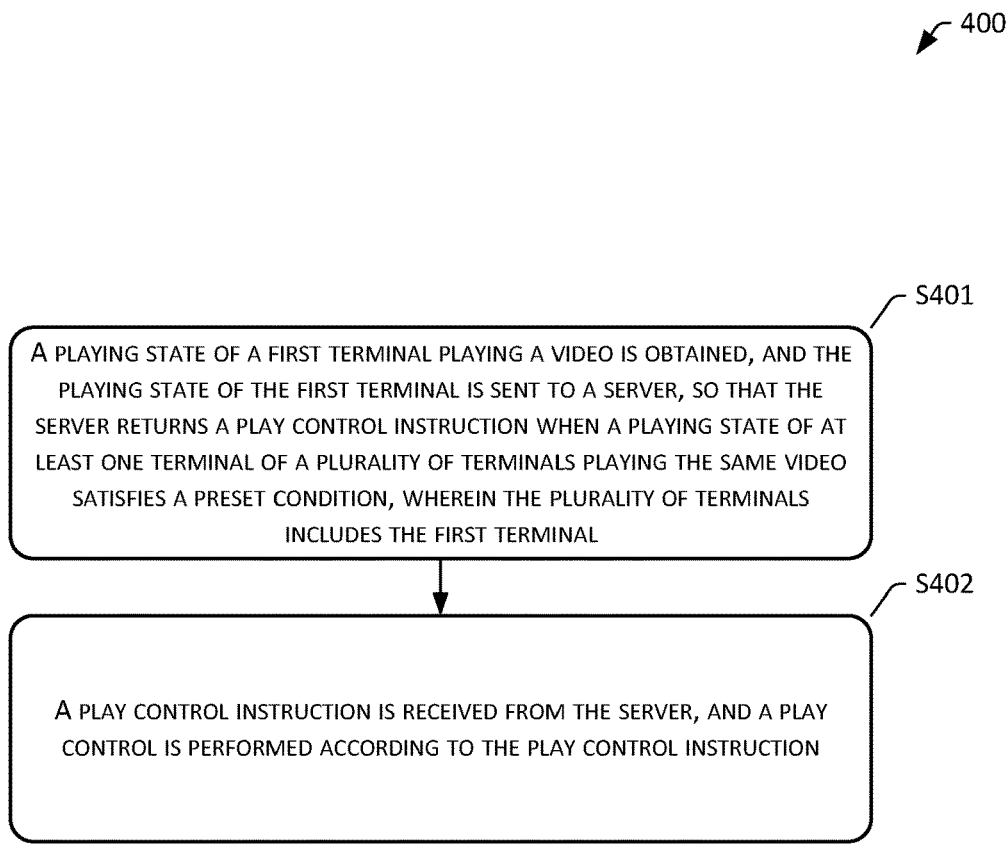
FIG. 4 illustrates a flowchart of an implementation of a play control method according to another embodiment of the present disclosure.

FIG. 4 illustrates a flowchart of an implementation of a play control method 400 according to another embodiment of the present disclosure. An execution entity of the present embodiment may be a mobile phone, a tablet computer, a notebook computer, or a PC (Personal Computer), etc., which is not limited herein. The method can be applied to a first terminal, and the first terminal can be any one terminal of a plurality of terminals that play a same video. As shown in FIG. 4, the method 400 may include the following operations.

S401: A playing state of a first terminal playing a video is obtained, and the playing state of the first terminal is sent to a server, so that the server returns a play control instruction when a playing state of at least one terminal of a plurality of terminals playing the same video satisfies a preset condition, wherein the plurality of terminals includes the first terminal.

In implementations, the first terminal can enter a same virtual viewing room with other terminals, and a same video is viewed by multiple terminals in the same virtual viewing room.

In the present embodiment, the first terminal may obtain a playing state of the first terminal playing a video in every preset time interval, and send the playing state of the first terminal to a server. The playing state of the first terminal may include one or more of a playing progress of the first terminal, whether the first terminal is in a pause playing state, and a state of connection between the first terminal and the server.

The playing state satisfying the preset condition may include a difference between the playing progress of the first terminal and a playing progress of the reference terminal being greater than a first preset value, or playing of the video is paused by a terminal of the plurality of terminals, or one of the plurality of terminals being disconnected from the server, which is not limited herein.

S402: A play control instruction is received from the server, and a play control is performed according to the play control instruction.

In the present embodiment, when a play control instruction is received from the server, a play control is performed in accordance with the play control instruction, whereby playback synchronization with the other terminals in the same virtual viewing room can be maintained.

The synchronization described in the present embodiment may be any of the following situations: playing progresses of the plurality of terminals being close to each other; playing progresses of most of the plurality of terminals being close to each other; the playing progresses of the plurality of terminals being the same; the playing progresses of most of the plurality of terminals being the same, which are not limited herein. A synchronization condition can also be set by one skilled in the art according to requirements, which is not limited herein.

The play control method according to the present embodiment can maintain a playback synchronization of multiple terminals under a premise of ensuring that the multiple terminals do not miss each video segment, so that no communication barrier is resulted due to asynchronous video playing during interactions between users who watch the same video, thus being able to improve user experience.

Figure 5:
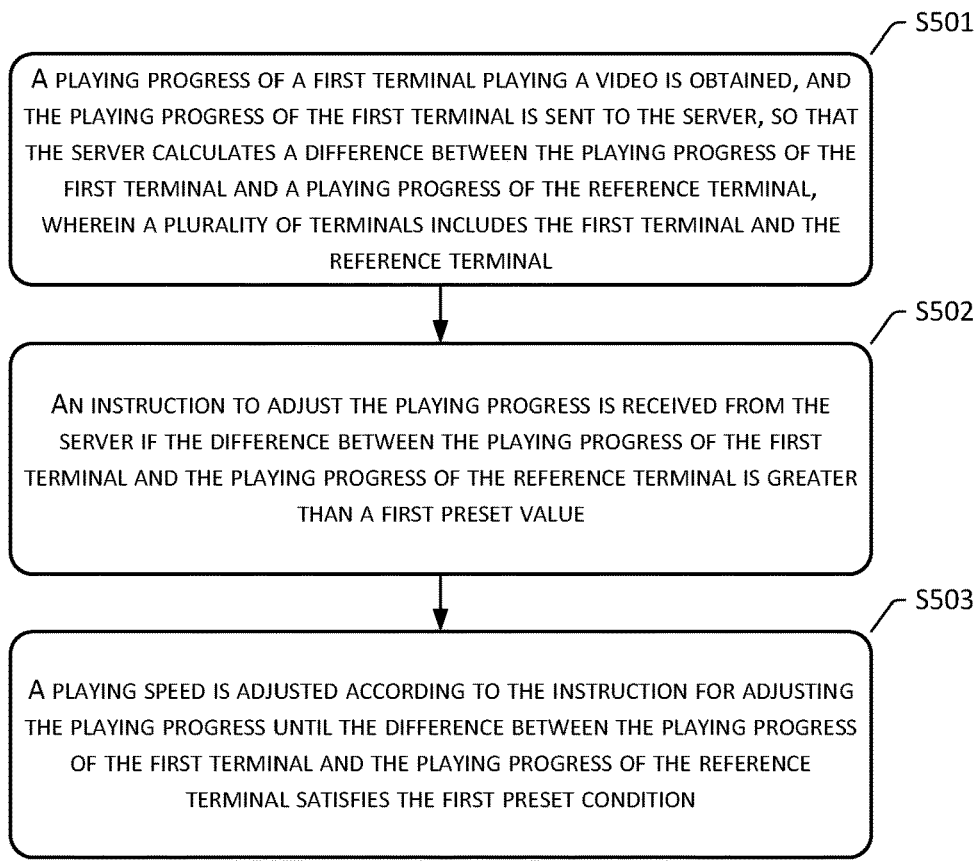
FIG. 5 illustrates a flowchart of an exemplary implementation of a play control method according to another embodiment of the present disclosure.

FIG. 5 illustrates a flowchart of an exemplary implementation of a play control method 500 according to another embodiment of the present disclosure. As shown in FIG. 5, the method 500 may include the following operations.

S501: A playing progress of a video played by a first terminal is obtained, and the playing progress of the first terminal is sent to the server, so that the server calculates a difference between the playing progress of the first terminal and a playing progress of the reference terminal, wherein a plurality of terminals includes the first terminal and the reference terminal.

In this example, obtaining a playing state of the first terminal playing the video includes obtaining the playing progress of the video played by the first terminal. In this example, the first terminal may obtain the playing progress of the video played by the first terminal in every preset time interval, and send the playing progress of the first terminal to the server.

In implementations, the method further includes obtaining a timestamp corresponding to the playing progress of the video played by the first terminal, and sending a correspondence relationship between the playing progress of the first terminal and the timestamp to the server. Obtaining the timestamp corresponding to the playing progress of the video played by the first terminal and sending the correspondence relationship between the playing progress and the timestamp of the first terminal to the server can enable the server to determine that respective speeds of playing progress of the same video played by each terminal according to respective correspondence relationships between timestamps and playing progresses.

S502: An instruction to adjust the playing progress is received from the server if the difference between the playing progress of the first terminal and the playing progress of the reference terminal is greater than a first preset value.

In this example, in case when the difference between the playing progress of the first terminal and the playing progress of the reference terminal is greater than the first preset value, the server sends an instruction for adjusting the playing progress to the first terminal, and the first terminal receives the instruction for adjusting the playing progress from the server.

S503: A playing speed is adjusted according to the instruction for adjusting the playing progress until the difference between the playing progress of the first terminal and the playing progress of the reference terminal satisfies the first preset condition.

In implementations, adjusting the playing speed according to the instruction for adjusting the playing progress includes decreasing the playing speed according to the instruction for adjusting the playing progress when the playing progress of the reference terminal is slower than the playing progress of the first terminal.

In implementations, adjusting the playing speed according to the instruction for adjusting the playing progress includes increasing the playing speed according to the instruction for adjusting the playing progress when the playing progress of the reference terminal is faster than the playing progress of the first terminal.

In implementations, the difference between the playing progress of the first terminal and the playing progress of the reference terminal satisfying the first preset condition includes the difference between the playing progress of the first terminal and the playing progress of the reference terminal being zero. For example, the playing progress of the reference terminal is slower than the playing progress of the first terminal, and the first preset value is two seconds. If the playing progress of the first terminal is faster than the playing progress of the reference terminal by three seconds, the difference between the playing progress of the first terminal and the playing progress of the reference terminal is greater than the first preset value. The playing progress of the first terminal needs to be slowed down by three seconds to enable the difference between the playing progress of the first terminal and the playing progress of the reference terminal to become zero. In this case, an instruction of slowing down a playing speed may be received from the server. For example, the instruction of slowing down the playing speed may be to reduce the playing speed by 25%, and to reduce the time of the playing speed to twelve seconds, thereby enabling the first terminal to complete playing of a 9-second video that needs to be played next in twelve seconds.

In implementations, the difference between the playing progress of the first terminal and the playing progress of the reference terminal satisfying the first preset condition includes the difference between the playing progress of the first terminal and the playing progress of the reference terminal being less than or equal to a second preset value, wherein the second preset value is determined based on the first preset value, and the second preset value is smaller than the first preset value. For example, the playing progress of the reference terminal is slower than the first terminal, the first preset value is two seconds, and the second preset value is one half of the first preset value, i.e., the second preset value is one second. If the playing progress of the first terminal is faster than the playing progress of the reference terminal by three seconds, the difference between the playing progress of the first terminal and the playing progress of the reference terminal is greater than the first preset value, and the playing progress of the first terminal needs to be slowed down by two seconds, to make the difference between the playing progress of the first terminal and the playing progress of the reference terminal to be less than or equal to the second preset value. In this case, an instruction for slowing down a playing speed may be received from the server. For example, the instruction for slowing slow down the playing speed may be to reduce the playing speed by 25%, to reduce the time of the playing speed to eight seconds, thereby enabling the first terminal to complete playing a 6-second video that needs to be played next in eight seconds.

In implementations, a play control instruction is received from the server, and a play control is performed according to the play control instruction, which include pausing the playing of the video according to an instruction to pause playing when the instruction to pause playing is received from the server.

In implementations, the method further includes receiving a voting requesting message from the server, and returning a voting result to the server according to the voting requesting message. The voting requesting message may be used by each terminal of the plurality of terminals in the same virtual viewing room to vote whether to wait for the second terminal. The voting result may include continuing to wait for the second terminal, not waiting for the second terminal, and abstention.

In implementations, a play control instruction is received from the server, and a play control is performed according to the play control instruction, which include continuing to play the video according to an instruction to resume playing when the instruction to resume playing is received from the server.

Figure 6:
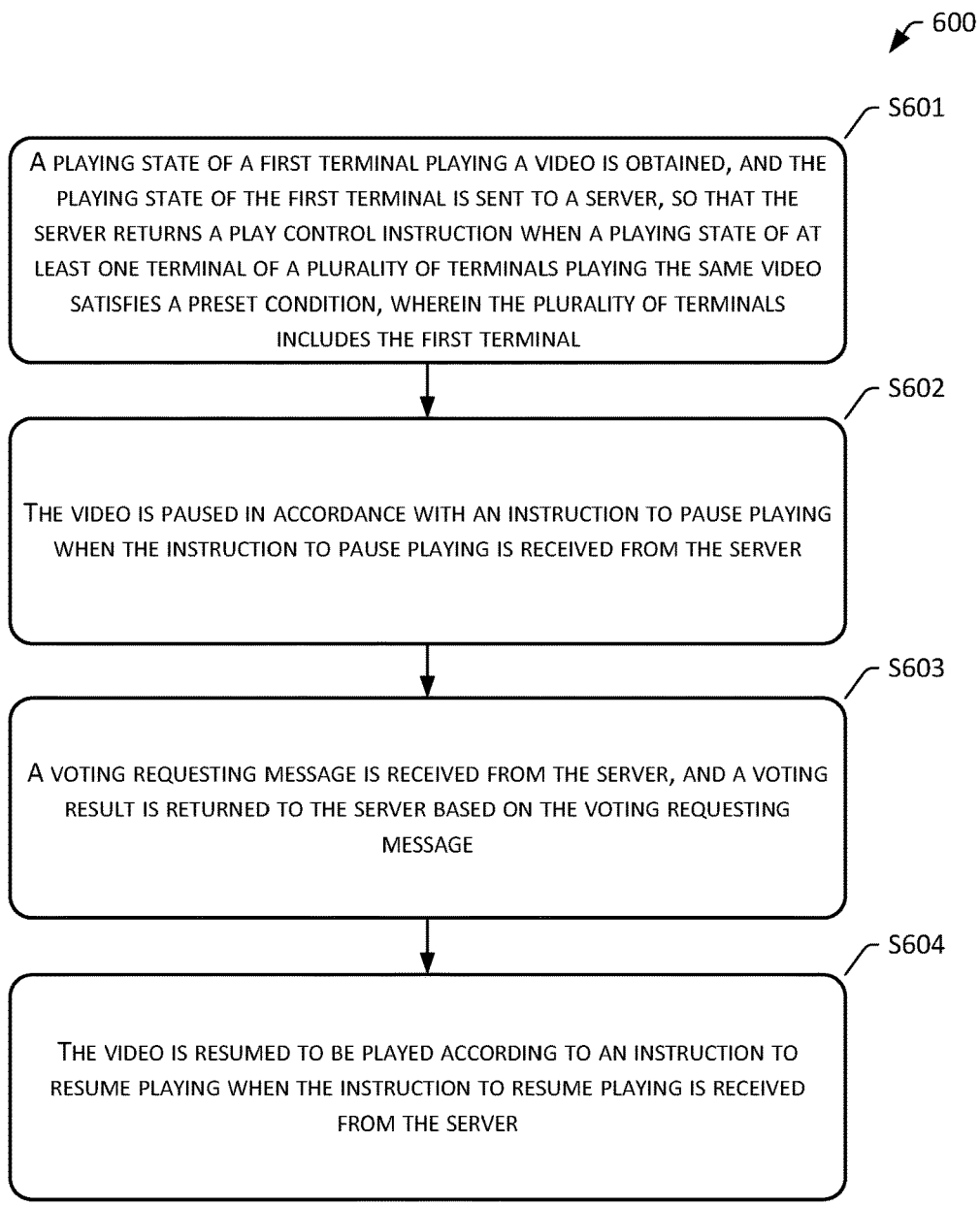
FIG. 6 illustrates a flowchart of an exemplary implementation of a play control method according to another embodiment of the present disclosure.

FIG. 6 illustrates a flowchart of an exemplary implementation of a play control method 600 according to another embodiment of the present disclosure. As shown in FIG. 6, the method 600 may include the following operations.

S601: A playing state of a first terminal playing a video is obtained, and the playing state of the first terminal is sent to a server, so that the server returns a play control instruction when a playing state of at least one terminal of a plurality of terminals playing the same video satisfies a preset condition, wherein the plurality of terminals includes the first terminal.

S602: The video is paused in accordance with an instruction to pause playing when the instruction to pause playing is received from the server.

S603: A voting requesting message is received from the server, and a voting result is returned to the server based on the voting requesting message.

S604: The video is resumed to be played according to an instruction to resume playing when the instruction to resume playing is received from the server.

By suspending playing of a video according to an instruction to pause playing when the instruction to pause playing is received from the server, a notification that a playing state of a second terminal satisfies a second preset condition is obtained, and playing of the video is paused to be synchronized with the playback of the second terminal under a condition that the second terminal in the same virtual viewing room pauses playing the video or is disconnected. By receiving a voting requesting message from the server and returning a voting result to the server according to the voting requesting message, it is possible to have multiple terminals in the same virtual viewing room other than the second terminal to decide whether to continue waiting for the second terminal, under the condition that the second terminal in the same virtual viewing room pauses playing the video or is disconnected, thereby being able to improve the experience of multiple users watching the same video.

Third Embodiment

Figure 7:
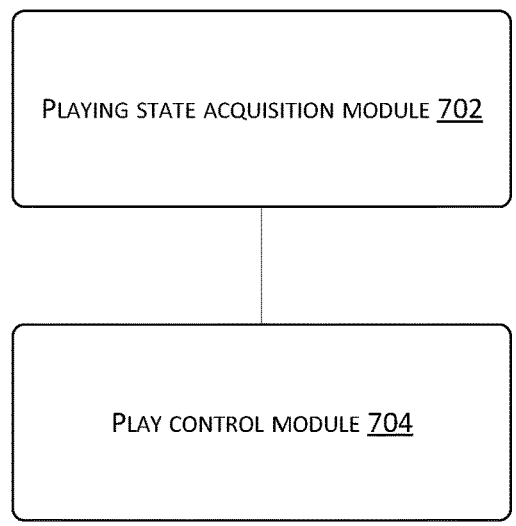
FIG. 7 is a structural block diagram of a play control apparatus according to another embodiment of the present disclosure.

FIG. 7 shows a structural block diagram of a play control apparatus 700 according to another embodiment of the present disclosure. As shown in FIG. 7, the apparatus 700 includes a playing state acquisition module 702 configured to obtain a playing state of at least one terminal of a plurality of terminals that play a same video; and a play control module 704 configured to control a playing progress of one or more terminals of the plurality of terminals when the playing state satisfies a preset condition.

Figure 8:
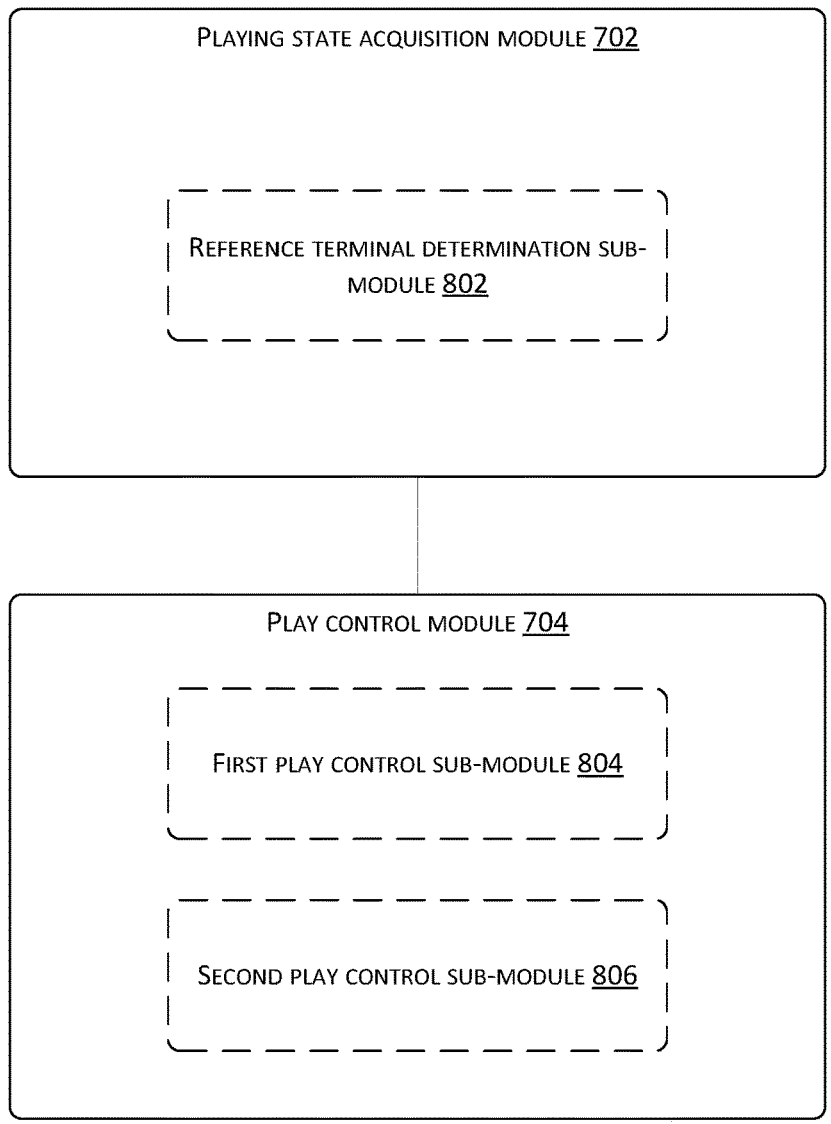
FIG. 8 illustrates a structural block diagram of an example of a play control apparatus according to another embodiment of the present disclosure.

FIG. 8 illustrates an exemplary structural block diagram of a play control apparatus 800 according to another embodiment of the present disclosure. Components in FIG. 8 that have the same reference numerals as those in FIG. 7 have the same functions, and a detailed description of these components is omitted for the sake of brevity.

In implementations, the playing state acquisition module 702 includes a reference terminal determination sub-module 802 configured to obtain playing progresses of the plurality of terminals playing the same video, and determine a reference terminal from among the plurality of terminals according to the playing progresses of the plurality of terminals. The play control module 704 includes a first play control sub-module 804 configured to separately calculate a difference between a playing progress of each of the plurality of terminals and a playing progress of the reference terminal; send a playing progress adjusting instruction to a first terminal of the plurality of terminals according to a difference between a playing progress of the first terminal and the playing progress of the reference terminal when the difference between the playing progress of the first terminal and the playing progress of the reference terminal is greater than a first preset value, to cause the first terminal to adjust a playing speed according to the playing progress adjusting instruction until the difference between the playing progress of the first terminal and the playing progress of the reference terminal satisfies a first preset condition, wherein the first terminal is any terminal in the plurality of terminals other than the reference terminal.

In implementations, the reference terminal determination sub-module 802 is configured to determine a terminal having the slowest playing progress as the reference terminal from among the plurality of terminals; or determine a terminal having the fastest playing progress as the reference terminal from among the plurality of terminals.

In implementations, the difference between the playing progress of the first terminal and playing progress of the reference terminal satisfying the first preset condition includes the difference between the playing progress of the first terminal and the playing progress of the reference terminal is zero; or the difference between the playing progress of the first terminal and the playing progress of the reference terminal being less than or equal to a second preset value, wherein the second preset value is determined based on the first preset value, and the second preset value is less than the first preset value.

In implementations, the play control module 704 includes a second play control sub-module 806 configured to send a playing pause instruction to terminal(s) other than a second terminal of the plurality of terminals after detecting that a playing state of the second terminal meets a second preset condition, to cause the other terminal(s) to pause playing the video, wherein the second terminal is any one of the plurality of terminals; send a voting requesting message to the other terminal(s), to cause the other terminal(s) to return voting result(s) according to the voting requesting message, wherein the voting requesting message is used for requesting each terminal in the other terminal(s) to vote whether to wait for the second terminal; collect statistics on the received voting result(s) to obtain a statistical result; and send a playing resume instruction to the other terminal(s) to cause the other terminal(s) to continue playing the video in response to determining that the statistical result is not to wait for the second terminal.

In implementations, the playing state of the second terminal satisfying the second preset condition includes the second terminal pausing playing of the video; and/or the second terminal being disconnected from the server.

The play control apparatus according to the present embodiment can maintain playback synchronization of multiple terminals under a premise of ensuring that the multiple terminals do not miss each video segment, so that no communication barrier is resulted due to asynchronous video playing during interactions between users who watch the same video, thus being able to improve user experience.

Fourth Embodiment

Figure 9:
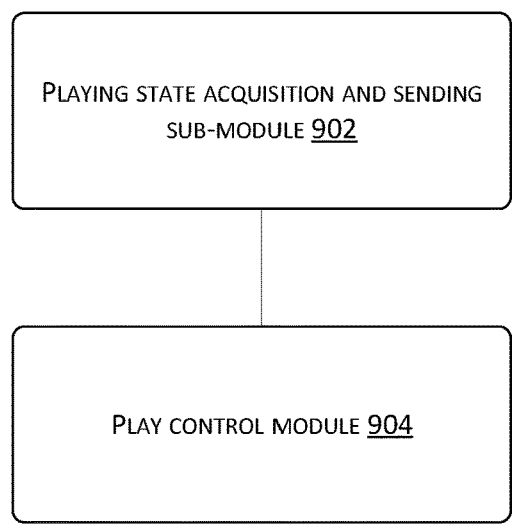
FIG. 9 is a structural block diagram of a play control apparatus according to another embodiment of the present disclosure.

FIG. 9 is a structural block diagram of a play control apparatus 900 according to another embodiment of the present disclosure. As shown in FIG. 9, the apparatus 900 includes a playing state acquisition and sending sub-module 902 configured to obtain a playing state of a first terminal playing a video, and send the playing state of the first terminal to a server, so that the server returns a play control instruction when a playing state of at least one terminal of a plurality of terminals playing the same video satisfies a preset condition, wherein the plurality of terminals include the first terminal; and a play control module 904 configured to receive the play control instruction from the server, and performing a play control according to the play control instruction.

Figure 10:
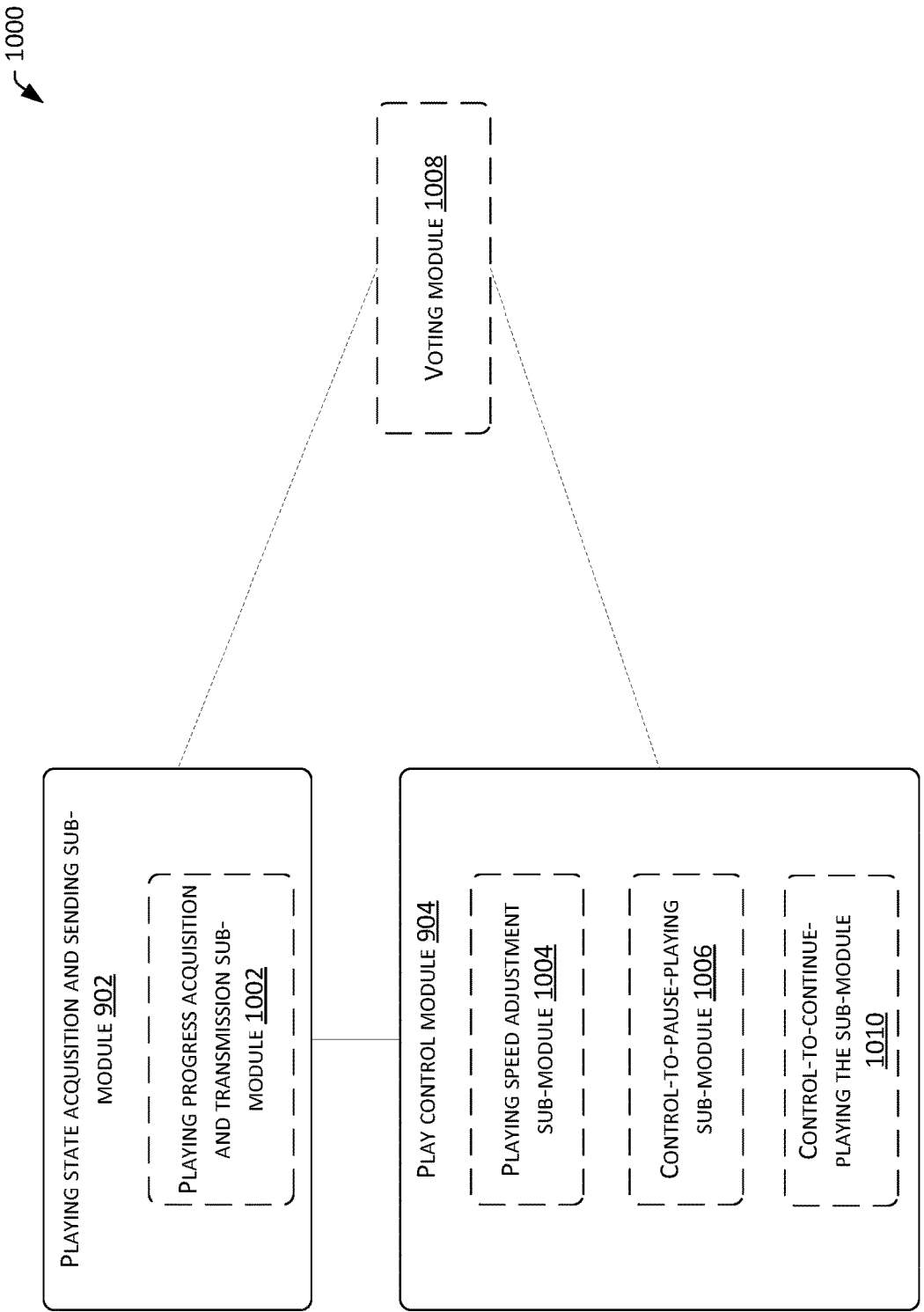
FIG. 10 illustrates a structural block diagram of an example of a play control apparatus according to another embodiment of the present disclosure.

FIG. 10 illustrates a structural block diagram of an example of a play control apparatus 1000 according to another embodiment of the present disclosure. Components in FIG. 10 that have the same reference numerals as those in FIG. 9 have the same functions, and a detailed description of these components is omitted for the sake of brevity.

In implementations, the playing state acquisition and transmission sub-module 902 includes a playing progress acquisition and transmission sub-module 1002 configured to obtain a playing progress of the video played by the first terminal, and send the playing progress of the first terminal to the server, so that the server calculates a difference between the playing progress of the first terminal and a playing progress of the reference terminal, wherein the plurality of terminals include the reference terminal. The control module 904 includes a playing speed adjustment sub-module 1004 configured to receive an instruction for adjusting the playing progress from the server in a case when the difference between the playing progress of the first terminal and the playing progress of the reference terminal is greater than a first preset value; and adjust a playing speed according to the instruction for adjusting the playing progress until the difference between the playing progress of the first terminal and the playing progress of the reference terminal satisfies the first preset condition.

In implementations, the playing speed adjustment sub-module 1004 is configured to decrease the playing speed according to the instruction for adjusting the playing progress if the playing progress of the reference terminal is slower than the playing progress of the first terminal; and increase the playing speed according to the instruction for adjusting the playing progress if the playing progress of the reference terminal is faster than the playing progress of the first terminal.

In implementations, the difference between the playing progress of the first terminal and the playing progress of the reference terminal satisfying the first preset condition includes the difference between the playing progress of the first terminal and the playing progress of the reference terminal being zero; or the difference between the playing progress of the first terminal and the playing progress of the reference terminal is less than or equal to a second preset value, wherein the second preset value is determined based on the first preset value, and the second preset value is less than the first preset value.

In implementations, the play control module 904 includes a control-to-pause-playing sub-module 1006 configured to pause playing the video in accordance with an instruction to pause playing when receiving an instruction to pause playing from the server.

In implementations, the apparatus 900 further includes a voting module 1008 configured to receive a voting requesting message from the server, and return a voting result to the server according to the voting requesting message.

In implementations, the play control module 904 includes a control-to-continue-playing the sub-module 1010 configured to continue playing the video in accordance with an instruction to resume playing in an event that the instruction to resume playing from the server is received.

The play control apparatus according to the present embodiment can maintain playback synchronization of multiple terminals under a premise of ensuring that the multiple terminals do not miss each video segment, so that no communication barrier is resulted due to asynchronous video playing during interactions between users who watch the same video, thus being able to improve user experience.

Fifth Embodiment

Figure 11:
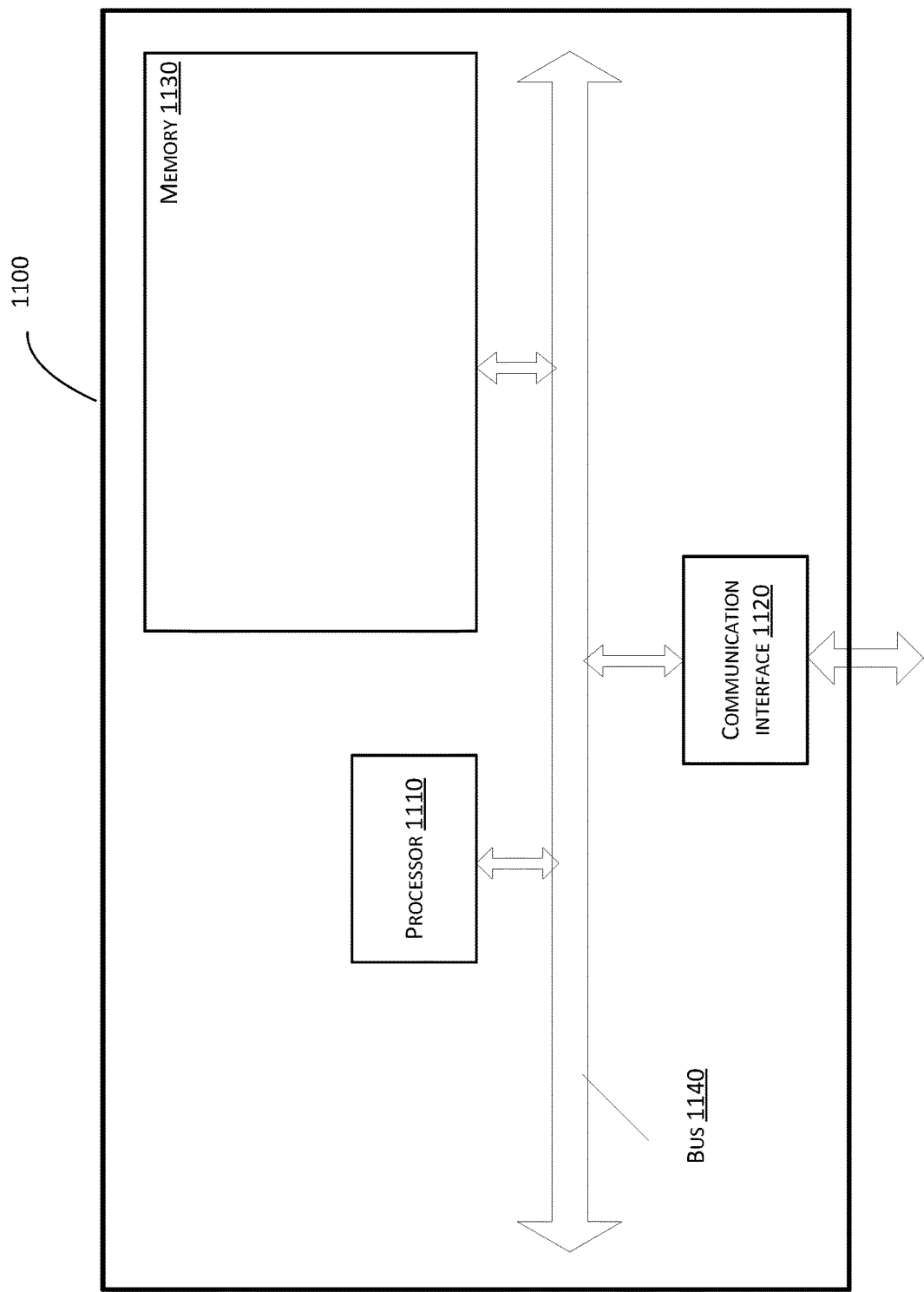
FIG. 11 illustrates a structural block diagram of an example of a play control device according to another embodiment of the present disclosure.

FIG. 11 is a structural block diagram of a play control device 1100 according to another embodiment of the present disclosure. The play control device 1100 may be a host server having a computing capability, a personal computer PC, or a portable computer or terminal that is wearable. Specific embodiments of the present disclosure do not limit specific implementations of a computing node.

The play control device 1100 includes a processor 1110, a communication interface 1120, memory 1130, and a bus 1140. The processor 1110, the communication interface 1120, and the memory 1130 complete communications with each other through the bus 1140.

The communication interface 1120 is configured to communicate with network devices. The network devices include, for example, a virtual machine management center, a shared storage, etc.

The processor 1110 is configured to execute a program. The processor 1110 may be a central processing unit (CPU), or an application specific integrated circuit (ASIC), or one or more integrated circuits configured to implement the embodiments of the present disclosure.

The memory 1130 is configured to store files. The memory 1130 may include a high speed RAM memory, and may also include a non-volatile memory, such as at least one magnetic disk. The memory 1130 can also be an array of storage devices. The memory 1130 may also be partitioned into blocks, and the blocks may be combined to be a virtual volume according to certain rules.

In implementations, the above program may be program codes including computer operating instructions. The program is specifically operable to perform operations of the steps of first or second embodiment.

One of ordinary skill in the art will appreciate that various exemplary elements and algorithm steps in the embodiments described herein can be implemented in electronic hardware, or a combination of computer software and electronic hardware. Whether these functions are implemented in hardware or software depends on a specific application and design constraints of a technical solution. One skilled in the art can select different methods for implementing described functions for a particular application, and such implementations should not be considered to be beyond the scope of the present disclosure.

If the functions are implemented in a form of computer software and sold or used as a stand-alone product, it is considered to some extent that all or part of the technical solutions of the present disclosure (for example, a part that makes contributions to existing technologies) is embodied in a form of a computer software product. The computer software product is typically stored in a computer readable non-volatile storage media, which includes instructions to cause a computing device (which may be a personal computer, a server, or a network device, etc.) to perform all or some of various method embodiments of the present disclosure. The storage media includes various media that can store program codes, such as a USB flash drive, a removable hard disk, a read-only memory (ROM), a random access memory (RAM), a magnetic disk, or an optical disk.

Figure 12:
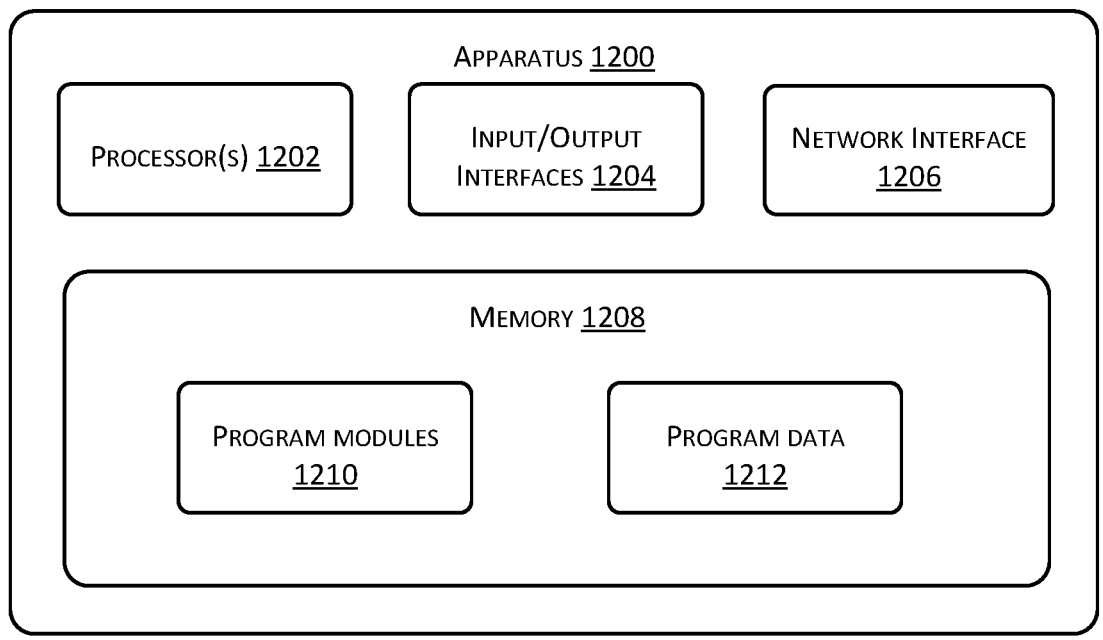
FIG. 12 illustrates a structural block diagram of a play control apparatus in further detail.

FIG. 12 is a structural block diagram of an example play control apparatus 1200 as shown in FIGS. 8-10 in further detail. In implementations, the apparatus 1200 may include one or more computing devices. In implementations, the apparatus 1200 may be a part of one or more computing devices, e.g., implemented or run by the one or more computing devices. In implementations, the one or more computing devices may be located in a single place or distributed among a plurality of network devices over a network. In implementations, the apparatus 1200 may be included in one or more servers or a cloud system.

In implementations, the apparatus 1200 may include one or more processors 1202, an input/output (I/O) interface 1204, a network interface 1206, and memory 1208.

The memory 1208 may include a form of computer readable media such as a volatile memory, a random access memory (RAM) and/or a non-volatile memory, for example, a read-only memory (ROM) or a flash RAM. The memory 1208 is an example of a computer readable media.

The computer readable media may include a volatile or non-volatile type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

In implementations, the memory 1208 may include program modules 1210 and program data 1212. Depending on which apparatus (such as apparatuses 800-1000) the apparatus 1200 represents, the program modules 1210 may include one or more of the modules and/or sub-modules as described in the foregoing description and FIGS. 8-10.

The above corresponds to specific embodiments of the present disclosure only, but the scope of protection of the present disclosure is not limited thereto. Any person skilled in the art can easily think of changes or replacements within the technical scope of the present disclosure, which should be covered within the scope of protection of the present disclosure. Therefore, the scope of protection of the present disclosure should be determined by the scope of the claims.

The present disclosure can be further understood using the following clauses.

Clause 1: A play control method comprising: obtaining a playing state of at least one of a plurality of terminals playing a same video; and controlling a playing progress of one or more of the plurality of terminals when the playing state meets a preset condition.

Clause 2: The method of Clause 1, wherein: obtaining the playing state of at least one of the plurality of terminals playing the same video comprises obtaining playing progresses of the plurality of terminals playing the same video, and determining a reference terminal from among the plurality of terminals according to the playing progresses of the plurality of terminals, and controlling the playing progress of the one or more of the plurality of terminals when the playing state meets the preset condition comprises: separately calculating a difference between a playing progress of each of the plurality of terminals and a playing progress of the reference terminal; and sending a playing progress adjusting instruction to a first terminal of the plurality of terminals according to a difference between a playing progress of the first terminal and the playing progress of the reference terminal when the difference between the playing progress of the first terminal and the playing progress of the reference terminal is greater than a first preset value, to cause the first terminal to adjust a playing speed according to the playing progress adjusting instruction until the difference between the playing progress of the first terminal and the playing progress of the reference terminal satisfies a first preset condition, wherein the first terminal is any terminal in the multiple terminals other than the reference terminal.

Clause 3: The method of Clause 2, wherein determining the reference terminal from among the plurality of terminals according to the playing progresses of the plurality of terminals comprises: determining a terminal having a slowest playing progress as the reference terminal from among the plurality of terminals; or determining a terminal having a fastest playing progress as the reference terminal from among the plurality of terminals.

Clause 4: The method of Clause 2, wherein the difference between the playing progress of the first terminal and playing progress of the reference terminal satisfying the first preset condition comprises: the difference between the playing progress of the first terminal and the playing progress of the reference terminal is zero; or the difference between the playing progress of the first terminal and the playing progress of the reference terminal being less than or equal to a second preset value, wherein the second preset value is determined based on the first preset value, and the second preset value is less than the first preset value.

Clause 5: The method of Clause 1, wherein controlling the playing progress of the one or more of the plurality of terminals when the playing state satisfies the preset condition comprises: sending a playing pause instruction to terminals other than a second terminal of the plurality of terminals after detecting that a playing state of the second terminal meets a second preset condition, to cause the other terminals to pause playing the video, wherein the second terminal is any one of the plurality of terminals; sending a voting requesting message to the other terminals, to cause the other terminals to return voting results according to the voting requesting message, wherein the voting requesting message is used for requesting each terminal in the other terminals to vote whether to wait for the second terminal; collecting statistics on the received voting results to obtain a statistical result; and sending a playing resume instruction to the other terminals to cause the other terminals to continue playing the video in response to determining that the statistical result is not to wait for the second terminal.

Clause 6: The method of Clause 5, wherein the playing state of the second terminal satisfying the second preset condition comprises: the second terminal pausing playing of the video; and/or the second terminal being disconnected from the server.

Clause 7: A play control method comprising: obtaining a playing state of a first terminal playing a video, and sending the playing state of the first terminal to a server, so that the server returns a play control instruction when a playing state of at least one terminal of a plurality of terminals playing the same video satisfies a preset condition, wherein the plurality of terminals include the first terminal; and receiving the play control instruction from the server, and performing a play control according to the play control instruction.

Clause 8: The method of Clause 7, wherein: obtaining the playing state of the first terminal playing the video, and sending the playing state of the first terminal to the server comprise: obtaining a playing progress of the video played by the first terminal; and sending the playing progress of the first terminal to the server, so that the server calculates a difference between the playing progress of the first terminal and a playing progress of the reference terminal, wherein the plurality of terminals include the reference terminal; receiving the play control instruction from the server, and performing the play control according to the play control instruction comprise: receiving an instruction for adjusting the playing progress from the server in a case when the difference between the playing progress of the first terminal and the playing progress of the reference terminal is greater than a first preset value; and adjusting a playing speed according to the instruction for adjusting the playing progress until the difference between the playing progress of the first terminal and the playing progress of the reference terminal satisfies the first preset condition.

Clause 9: The method of Clause 8, wherein adjusting the playing speed according to the instruction for adjusting the playing progress comprises: decreasing the playing speed according to the instruction for adjusting the playing progress if the playing progress of the reference terminal is slower than the playing progress of the first terminal; and increasing the playing speed according to the instruction for adjusting the playing progress if the playing progress of the reference terminal is faster than the playing progress of the first terminal.

Clause 10: The method of Clause 8, wherein the difference between the playing progress of the first terminal and the playing progress of the reference terminal satisfying the first preset condition comprises: the difference between the playing progress of the first terminal and the playing progress of the reference terminal being zero; or the difference between the playing progress of the first terminal and the playing progress of the reference terminal is less than or equal to a second preset value, wherein the second preset value is determined based on the first preset value, and the second preset value is less than the first preset value.

Clause 11: The method of Clause 7, wherein receiving the play control instruction from the server, and performing the play control according to the play control instruction comprise pausing to play the video in accordance with an instruction to pause playing when receiving an instruction to pause playing from the server.

Clause 12: The method of any one of Clauses 7-11, further comprising receiving a voting requesting message from the server, and returning a voting result to the server according to the voting requesting message.

Clause 13: The method of any one of Clauses 7-11, wherein receiving the play control instruction from the server, and performing the play control according to the play control instruction comprise continuing to play the video in accordance with an instruction to resume playing in an event that the instruction to resume playing from the server is received.

Clause 14: A play control apparatus comprising: a playing state acquisition module configured to obtain a playing state of at least one of a plurality of terminals playing a same video; and a play control module configured to control a playing progress of one or more of the plurality of terminals when the playing state meets a preset condition.

Clause 15: The apparatus of Clause 14, wherein: the playing state acquisition module comprises a reference terminal determination sub-module configured to obtain playing progresses of the plurality of terminals playing the same video, and determine a reference terminal from among the plurality of terminals according to the playing progresses of the plurality of terminals; and the play control module comprises a first play control sub-module configured to separately calculate a difference between a playing progress of each of the plurality of terminals and a playing progress of the reference terminal; send a playing progress adjusting instruction to a first terminal of the plurality of terminals according to a difference between a playing progress of the first terminal and the playing progress of the reference terminal when the difference between the playing progress of the first terminal and the playing progress of the reference terminal is greater than a first preset value, to cause the first terminal to adjust a playing speed according to the playing progress adjusting instruction until the difference between the playing progress of the first terminal and the playing progress of the reference terminal satisfies a first preset condition, wherein the first terminal is any terminal in the plurality of terminals other than the reference terminal.

Clause 16: The apparatus of Clause 15, wherein the reference terminal determination sub-module is configured to: determine a terminal having a slowest playing progress as the reference terminal from among the plurality of terminals; or determine a terminal having a fastest playing progress as the reference terminal from among the plurality of terminals.

Clause 17: The apparatus of Clause 15, wherein the difference between the playing progress of the first terminal and playing progress of the reference terminal satisfying the first preset condition comprises: the difference between the playing progress of the first terminal and the playing progress of the reference terminal is zero; or the difference between the playing progress of the first terminal and the playing progress of the reference terminal being less than or equal to a second preset value, wherein the second preset value is determined based on the first preset value, and the second preset value is less than the first preset value.

Clause 18: The apparatus of Clause 14, wherein the play control module comprises a second play control sub-module configured to: send a playing pause instruction to terminals other than a second terminal of the plurality of terminals after detecting that a playing state of the second terminal meets a second preset condition, to cause the other terminals to pause playing the video, wherein the second terminal is any one of the plurality of terminals; send a voting requesting message to the other terminals, to cause the other terminals to return voting results according to the voting requesting message, wherein the voting requesting message is used for requesting each terminal in the other terminals to vote whether to wait for the second terminal; collect statistics on the received voting results to obtain a statistical result; and send a playing resume instruction to the other terminals to cause the other terminals to continue playing the video in response to determining that the statistical result is not to wait for the second terminal.

Clause 19: The apparatus of Clause 18, wherein the playing state of the second terminal satisfying the second preset condition comprises: the second terminal pausing playing of the video; and/or the second terminal being disconnected from the server.

Clause 20: A play control apparatus comprising: a playing state acquisition and sending sub-module configured to obtain a playing state of a first terminal playing a video, and send the playing state of the first terminal to a server, so that the server returns a play control instruction when a playing state of at least one terminal of a plurality of terminals playing the same video satisfies a preset condition, wherein the plurality of terminals include the first terminal; and a play control module configured to receive the play control instruction from the server, and performing a play control according to the play control instruction.

Clause 21: The apparatus of Clause 20, wherein: the playing state acquisition and sending sub-module comprises a playing progress acquisition and sending sub-module configured to obtain a playing progress of the video played by the first terminal, and send the playing progress of the first terminal to the server, so that the server calculates a difference between the playing progress of the first terminal and a playing progress of the reference terminal, wherein the plurality of terminals include the reference terminal; and a play control module comprises a playing speed adjustment sub-module configured to receive an instruction for adjusting the playing progress from the server in a case when the difference between the playing progress of the first terminal and the playing progress of the reference terminal is greater than a first preset value; and adjust a playing speed according to the instruction for adjusting the playing progress until the difference between the playing progress of the first terminal and the playing progress of the reference terminal satisfies the first preset condition.

Clause 22: The apparatus of Clause 21, wherein the playing speed adjustment sub-module is configured to: decrease the playing speed according to the instruction for adjusting the playing progress if the playing progress of the reference terminal is slower than the playing progress of the first terminal; and increase the playing speed according to the instruction for adjusting the playing progress if the playing progress of the reference terminal is faster than the playing progress of the first terminal.

Clause 23: The apparatus of Clause 21, wherein the difference between the playing progress of the first terminal and the playing progress of the reference terminal satisfying the first preset condition comprises: the difference between the playing progress of the first terminal and the playing progress of the reference terminal being zero; or the difference between the playing progress of the first terminal and the playing progress of the reference terminal is less than or equal to a second preset value, wherein the second preset value is determined based on the first preset value, and the second preset value is less than the first preset value.

Clause 24: The apparatus of Clause 20, wherein the play control module comprises a control-to-pause-playing sub-module configured to pause playing the video in accordance with an instruction to pause playing when receiving an instruction to pause playing from the server.

Clause 25: The apparatus of any one of Clauses 20-24, further comprising a voting module configured to receive a voting requesting message from the server, and return a voting result to the server according to the voting requesting message.

Clause 26: The apparatus of any one of Clauses 20-24, wherein the play control module includes a control-to-continue-playing the sub-module configured to continue playing the video in accordance with an instruction to resume playing in an event that the instruction to resume playing from the server is received.

Clause 27: A play control apparatus comprising: a processor; and memory configured to store processor executable instructions, the processor being configured to: obtain a playing state of at least one of a plurality of terminals playing a same video; and control a playing progress of one or more of the plurality of terminals when the playing state meets a preset condition.

Clause 28: A play control apparatus comprising: a processor; and memory configured to store processor executable instructions, the processor being configured to: obtain a playing state of a first terminal playing a video, and send the playing state of the first terminal to a server, so that the server returns a play control instruction when a playing state of at least one terminal of a plurality of terminals playing the same video satisfies a preset condition, wherein the plurality of terminals include the first terminal; and receive the play control instruction from the server, and perform a play control according to the play control instruction.

What is claimed is:

1. A method implemented by one or more computing devices, the method comprising:
   obtaining a playing state of at least one terminal of a plurality of terminals playing a video;
   obtaining playing progresses of the plurality of terminals;
   determining a reference terminal from the plurality of terminals according to the playing progresses of the plurality of terminals; and
   controlling a playing progress of the at least one terminal of the plurality of terminals according to the reference terminal when the playing state meets a preset condition.

2. The method of claim 1, wherein:
   controlling the playing progress of the at least one terminal of the plurality of terminals when the playing state meets the preset condition comprises:
      separately calculating a difference between the playing progress of each of the plurality of terminals and the playing progress of the reference terminal; and
      sending a playing progress adjusting instruction to a first terminal of the plurality of terminals upon determining that the difference is greater than a first preset value, to cause the first terminal to adjust a playing speed until the difference between the playing progress of the first terminal and the playing progress of the reference terminal satisfies a first preset condition, wherein the first terminal is any terminal in the plurality of terminals other than the reference terminal.

3. The method of claim 1, wherein determining the reference terminal from the plurality of terminals according to the playing progresses of the plurality of terminals comprises:
   determining a terminal having a slowest playing progress as the reference terminal from the plurality of terminals; or
   determining a terminal having a fastest playing progress as the reference terminal from among the plurality of terminals.

4. The method of claim 2, wherein the difference between the playing progress of the first terminal and playing progress of the reference terminal satisfying the first preset condition comprises:
   the difference between the playing progress of the first terminal and the playing progress of the reference terminal being zero; or
   the difference between the playing progress of the first terminal and the playing progress of the reference terminal being less than or equal to a second preset value, wherein the second preset value is determined based on the first preset value, and the second preset value is less than the first preset value.

5. The method of claim 1, wherein controlling the playing progress of the at least one terminal of the plurality of terminals according to the reference terminal when the playing state satisfies the preset condition comprises:
   detecting that the playing state of the second terminal meets a second preset condition;
   sending a playing pause instruction to one or more third terminals other than the second terminal of the plurality of terminals, to cause the one or more third terminals to pause playing the video, wherein the second terminal is any one of the plurality of terminals;
   sending a voting requesting message to the one or more third terminals, to cause the one or more third terminals to return voting results according to the voting requesting message, wherein the voting requesting message is used for requesting each terminal in the one or more third terminals to vote whether to wait for the second terminal;
   collecting statistics on the voting results to obtain a statistical result; and
   sending a playing resume instruction to the one or more third terminals to cause the one or more third terminals to continue playing the video in response to determining that the statistical result is not to wait for the second terminal.

6. The method of claim 5, wherein the playing state of the second terminal satisfying the second preset condition comprises at least one of:
   the second terminal pausing playing of the video; or
   the second terminal being disconnected from a server.

7. One or more computer readable media storing executable instructions that, when executed by one or more processors, cause the one or more processors to perform acts comprising:
   obtaining a playing state of a first terminal playing a video;
   sending the playing state of the first terminal to a server, causing the server to obtain playing progresses of a plurality of terminals, and determine a reference terminal from the plurality of terminals according to the playing progresses, wherein the plurality of terminals include the first terminal;

receiving, from the server, a play control instruction determined based upon the reference terminal and the playing state of the first terminal satisfying a preset condition; and performing a play control on the first terminal according to the play control instruction.

8. The one or more computer readable media of claim 7, wherein:

receiving, from the server, the play control instruction from the server, further comprises:

receiving the play control instruction for adjusting the playing progress of the first terminal from the server upon determining that a difference between the playing progress of the first terminal and the playing progress of the reference terminal is greater than a first preset value; and performing the play control on the first terminal according to the play control instruction further comprises:

adjusting a playing speed according to the play control instruction for adjusting the playing progress of the first terminal until the difference between the playing progress of the first terminal and the playing progress of the reference terminal satisfies a first preset condition.

9. The one or more computer readable media of claim 8, wherein adjusting the playing speed according to the play control instruction for adjusting the playing progress of the first terminal comprises:

decreasing the playing speed according to the play control instruction for adjusting the playing progress of the first terminal if the playing progress of the reference terminal is slower than the playing progress of the first terminal; or increasing the playing speed according to the play control instruction for adjusting the playing progress of the first terminal if the playing progress of the reference terminal is faster than the playing progress of the first terminal.

10. The one or more computer readable media of claim 8, wherein the difference between the playing progress of the first terminal and the playing progress of the reference terminal satisfying the first preset condition comprises:

the difference between the playing progress of the first terminal and the playing progress of the reference terminal being zero; or the difference between the playing progress of the first terminal and the playing progress of the reference terminal being less than or equal to a second preset value, wherein the second preset value is determined based on the first preset value, and the second preset value is less than the first preset value.

11. The one or more computer readable media of claim 7, wherein performing the play control on the first terminal according to the play control instruction comprise:

pausing playing the video on the first terminal in accordance with the play control instruction.

12. The one or more computer readable media of claim 7, the acts further comprising receiving a voting requesting message from the server, and returning a voting result to the server according to the voting requesting message.

13. The one or more computer readable media of claim 7, wherein performing the play control on the first terminal according to the play control instruction comprise:

continuing playing the video on the first terminal in accordance with the play control instruction.

14. The method of claim 2, further comprising:

obtaining a timestamp corresponding to the playing progress of individual terminal of the plurality of terminals; and determining the playing speed of the individual terminal of the plurality of terminals based on the timestamp.

15. An apparatus comprising:

one or more processors;

memory;

a playing state acquisition module stored in the memory and executed by the one or more processors to obtain a playing state of at least one terminal of a plurality of terminals playing a video, the playing state acquisition module comprising a reference terminal determination sub-module configured to obtain playing progresses of the plurality of terminals, and determine a reference terminal from the plurality of terminals according to the playing progresses; and a play control module stored in the memory and executed by the one or more processors to control a playing progress of the at least one terminal of the plurality of terminals when the playing state meets a preset condition.

16. The apparatus of claim 15, wherein the play control module comprises a first play control sub-module configured to:

separately calculate a difference between the playing progress of each of the plurality of terminals and the playing progress of the reference terminal;

send a playing progress adjusting instruction to a first terminal of the plurality of terminals upon determining that the difference is greater than a first preset value, to cause the first terminal to adjust a playing speed until the difference between the playing progress of the first terminal and the playing progress of the reference terminal satisfies a first preset condition, wherein the first terminal is any terminal in the plurality of terminals other than the reference terminal.

17. The apparatus of claim 16, wherein the reference terminal determination submodule is configured to:

determine a terminal having a slowest playing progress as the reference terminal from among the plurality of terminals; or determine a terminal having a fastest playing progress as the reference terminal from among the plurality of terminals.

18. The apparatus of claim 16, wherein the difference between the playing progress of the first terminal and playing progress of the reference terminal satisfying the first preset condition comprises:

the difference between the playing progress of the first terminal and the playing progress of the reference terminal being zero; or the difference between the playing progress of the first terminal and the playing progress of the reference terminal being less than or equal to a second preset value, wherein the second preset value is determined based on the first preset value, and the second preset value is less than the first preset value.

19. The apparatus of claim 15, wherein the play control module comprises a second play control sub-module configured to:

detect that the playing state of the second terminal meets a second preset condition;

send a playing pause instruction to one or more third terminals other than the second terminal of the plurality of terminals, to cause the one or more third terminals to pause playing the same video, wherein the second terminal is any one of the plurality of terminals;

send a voting requesting message to the one or more third terminals, to cause the one or more third terminals to return voting results according to the voting requesting message, wherein the voting requesting message is used for requesting each terminal in the one or more third terminals to vote whether to wait for the second terminal;

collect statistics on the voting results to obtain a statistical result; and send a playing resume instruction to the one or more third terminals to cause the one or more third terminals to continue playing the video in response to determining that the statistical result is not to wait for the second terminal.

20. The apparatus of claim 19, wherein the playing state of the second terminal satisfying the second preset condition comprises at least one of:

the second terminal pausing playing of the video; or the second terminal being disconnected from a server.

* * * * *